United States Patent
Torge et al.

(10) Patent No.: US 7,702,607 B2
(45) Date of Patent: Apr. 20, 2010

(54) DIALOGUE SYSTEM FOR USER REQUESTS CONTROLLING NETWORK DEVICES BY FSM WITH PLAN LANGUAGE

(75) Inventors: Sunna Torge, Freiburg (DE); Martin Emele, Bad Homburg (DE)

(73) Assignee: Sony Deutschland GmbH, Cologne (DE)

( * ) Notice: Subject to any disclaimer, the term of this patent is extended or adjusted under 35 U.S.C. 154(b) by 1005 days.

(21) Appl. No.: 11/099,084

(22) Filed: Apr. 5, 2005

(65) Prior Publication Data

US 2005/0234726 A1  Oct. 20, 2005

(30) Foreign Application Priority Data

Apr. 6, 2004  (EP)  ................................. 04008335

(51) Int. Cl.
*G06N 5/02* (2006.01)
(52) U.S. Cl. ........................................... 706/46; 706/45
(58) Field of Classification Search .................... 706/45, 706/46
See application file for complete search history.

(56) References Cited

U.S. PATENT DOCUMENTS

| | | | | |
|---|---|---|---|---|
| 5,046,022 | A  * | 9/1991 | Conway et al. | 700/250 |
| 5,838,768 | A  * | 11/1998 | Sumar et al. | 379/88.14 |
| 2002/0120474 | A1 * | 8/2002 | Hele et al. | 705/4 |
| 2004/0098245 | A1 * | 5/2004 | Walker et al. | 704/1 |
| 2004/0247281 | A1 * | 12/2004 | Torge et al. | 386/46 |
| 2005/0091059 | A1 * | 4/2005 | Lecoeuche | 704/270.1 |

FOREIGN PATENT DOCUMENTS

| | | |
|---|---|---|
| EP | 1 315 147 | 5/2003 |
| EP | 1 478 154 A1 | 11/2004 |

OTHER PUBLICATIONS

Torge et al. "The Planning Component of An Intelligent Human Machine Interface in Changing Environments", Multi-Modal Dialogue in Mobile Environments, 2002.*

(Continued)

*Primary Examiner*—David R Vincent
*Assistant Examiner*—Li-Wu Chang
(74) *Attorney, Agent, or Firm*—Oblon, Spivak, McClelland, Maier & Neustadt, L.L.P.

(57) ABSTRACT

A Method of operating a dialogue system for serving complex user requests by appropriately controlling a network of devices (D1, ..., Dn) and/or applications, wherein each device (D1, ..., Dn) and/or application and its functionality are modeled by a finite state machine (FSM-1, FSM-2, FSM-3), which is using a plan language, wherein a reasoning component (1) is used in order to determine a plan (P) using said plan language for serving a received complex user request, wherein said reasoning component (1) is adapted for determining said plan (P) using said finite state machines (FSM-1, FSM-2, FSM-3), of said devices (D1, ..., Dn) and/or applications, wherein a plan processing module (2) is used in order to perform a determined plan (P) for serving a received user request, and wherein said plan language is designed in order to enable the determination of conditional plans by said reasoning component (1), in particular by providing conditional planning commands.

19 Claims, 9 Drawing Sheets

OTHER PUBLICATIONS

Torge et al. "Serving Complex User Wishes with An Enhanced Spoken Dialogue Systems", 7th ICSLP, 2002, pp. 16-20.*

Tope Omitola, DJ Greaves, "Towards Autonomous Dependable Systems" Internet Document, 'Online! Feb. 25, 2004, XP002305283.

Thorsten Herfet, Thomas Kirste, Michael Schnaider: "EMBASSI—Multimodal Assistance for Infotainment and Service Infrastructures" Research Project, 2001, -2003 XP002305536.

Thorsten Herfet, Thomas Kirste, Michael Schnaider: "EMBASSI multimodal assistance for infotainment and service infrastructures" Computers and Graphics, Pergamon Press Ltd. Oxford, GB, vol. 25, No. 4, Aug. 2001, pp. 581-592, XP004296035.

"PDDL2.1. An Extension to PDDL for Expressing Temporal Planning Domains" Maria Fox and Derek Long, Department of Computer and Information Sciences, University of Strathclyde, Glasgow, Uk, pp. 61-124.

"Supporting Goal-Based Interaction with Dynamic Intelligent Environments," Thomas Heider and Thomas Kirste, pp. 596-600.

"An Overview of Recent Algorithms for AI Planning." Jussi Rintanen, Jörg Hoffmann, pp. 5-11.

* cited by examiner

Information Request 1. action(sendRequestNavigationService)
   goal(navigationService, getInformation)
2. wait(results)

Send an email 3. action(sendEmail)
   goal(emailService, active)
4. Wait(successfullySent)
   goal(emailService, ready))

5. action(reportResults)
   goal(navigationService, ready)

DIALOGUE SYSTEM FOR USER REQUESTS CONTROLLING NETWORK DEVICES BY FSM WITH PLAN LANGUAGE

The present invention relates to a method for operating a dialogue system for serving complex user requests by appropriately controlling a network of devices and/or applications and, more particular, to a method for operating a man-machine-interface unit in which complex user wishes or tasks can be realized.

Nowadays, a large variety of equipment and appliances employ man-machine-interface techniques, man-machine-dialogue systems, and/or the like, to ensure an easy and reliable use of the equipment and to increase the user's convenience, in particular in the field of network or home-network arrangements employing a variety of different devices connected thereto and offering a variety of possible services to the user.

In prior art methods and systems for serving user requests and/or for operating man-machine-interface units, in particular in the field of home networks, direct and more or less precise commands are expected by a dialogue manager of said man-machine-interface unit to map the received command uttered by a user directly to an action of a certain device. Therefore, in prior art methods and systems the user has to be aware of the devices and capabilities of the network and has to think in terms of concrete devices and actions.

Also, in prior art methods and systems for serving user requests, the system may not be used when it is busy serving a previous user wish.

It is an object underlying the present invention to provide a method for operating a dialogue system for serving complex user requests by appropriately controlling a network of devices and/or applications which is more flexible and less complex than prior art systems. It is a further object of the invention to save a user time when using said dialogue system operated by a method according to the invention. Still another object of the invention is to provide a dialogue system, a computer program product, and a computer readable storage medium which are improving prior art systems, products, and computer readable storage mediums, respectively.

To achieve these objects, the invention provides a method for operating a dialogue system for serving complex user requests according to claim 1. In addition, the invention provides a further method for operating a dialogue system according to claim 3. Further, the invention provides a dialogue system, a computer program product, and a computer readable storage medium, as defined in claims 21, 22, and 23, respectively. Further features and preferred embodiments are respectively defined in respective subclaims and/or in the following description.

The invention provides a method for operating a dialogue system for serving complex user requests by appropriately controlling a network of devices and/or applications,
  wherein each device and/or application is modeled by a finite state machine, said finite state machine being descriptive for the functions and states of a respective device and/or application,
  wherein transitions and/or states of said finite state machine are annotated with statements of a plan language,
  wherein a reasoning component is used in order to determine a determined plan, said reasoning component being adapted for using said finite state machines in order to determine said determined plan, said determined plan being based on said plan language,
  wherein a plan processing module or plan processor and/or performing process or a performing component is used in order to perform said determined plan for serving a received user request, and
  wherein said plan language is designed in order to enable the determination of conditional plans by said reasoning component, in particular by providing conditional planning commands.

Preferably, said plan processing module is adapted for realizing one sub-process or any combination of sub-processes of the following group of sub-processes consisting of:
  serving different tasks in parallel,
  scheduling tasks at given certain times, and
  interrupting tasks with respect to user and/or application interrupts.

The invention also provides a further method for operating a dialog system for serving complex user requests by appropriately controlling a network of devices and/or applications:
  wherein each device and/or application is modeled by a finite state machine, said finite state machine being descriptive for the functions and states of a respective device and/or application,
  wherein transitions and/or states of said finite state machine are annotated with statements of a plan language,
  wherein a reasoning component is used in order to determine a determined plan, said reasoning component being adapted for using said finite state machines in order to determine said determined plan, said determined plan being based on said plan language,
  wherein a plan processing module or plan processor and/or performing process or a performing component is used in order to perform said determined plan for serving a received user request, and
  wherein said plan processing module is adapted to realize one sub-process or any combination of sub-processes of the following group of sub-processes:
  serving different tasks in parallel,
  scheduling tasks at given certain times, and
  interrupting tasks with respect to user and/or application interrupts.

Preferable, within said further method, said plan language is designed in order to enable the determination of conditional plans by said reasoning component, in particular by providing conditional planning commands.

In a preferred embodiment, said method comprises:
  a planning stage, wherein said determined plan or at least one further plan is determined or said determined plan is modified by said reasoning component,
  an executing stage, wherein said determined plan and/or said at least one further plan is executed by said plan processing module, and
  at least one switching step for switching back and forth between said planning stage and said executing stage, in particular when processing a conditional plan or serving different tasks in parallel.

It should be noted, that a finite state machine is particularly suited for describing a device and/or application by an internal model. The transitions of said finite state machines of the internal model of devices and/or applications are denoted, i.e. annotated by statements of said plan language. A statement of said plan language may have certain parameters. For example, an ACTION-statement may have a parameter "sendRequestNavigationService". In this example, an ACTION-statement denotes a transition of a finite state machine describing a request that is sent to a navigation service. The different statements are described in more detail below.

A plan or determined plan consists of at least one statement of said plan language and said reasoning component generates an ordered series or set of statements that build up said plan. Said reasoning component thereby operates on said finite state machine of said internal model of a respective device and/or application. The ordered set of statements, i.e. the determined plan is then processed by said plan processing module, i.e. said plan processing module executes the ordered set of statements of a plan preferably subsequently. The length of a plan corresponds to the number of statements of the plan.

A further advantage of using one or more finite state machines for the description of the internal models of said devices and/or applications is that ready-to-use algorithms exist that operate on these finite state machines. With respect to finite state machines, it should be noted that here, devices need to be modeled, which devices can be in different states. These different states are the main information, which is important for the whole dialogue system in order to infer to how to fulfill a user wish, i.e. a user request. Therefore, finite state machines (FSM) are an appropriate means to model devices. Finite state machines are simple models although quite powerful. The simplicity of finite state machines ensures efficiency, and finite state machines are easy to understand. This is an important point regarding plug and play, where devices and/or applications may be removed and/or connected to said network without any or only very little necessary adaptations. In case of plug and play, a device should incorporate the model, i.e. the model should be designed by an engineer. Simple models not necessarily need to be provided by specialists, but by anybody after a short introduction. Another advantage of finite state machines is the following: Depending on the complexity of the network, a finite state machine can be enhanced to model more and more complex features by e.g. annotating states with conditions. In this case, the algorithms also become more complex, however, for simple finite state machines ready-to-use algorithms can be used.

Aspects of the invention therefore include, with respect to the planning, i.e. determining of a plan:

conditional planning: the finite state machines of the internal models may contain conditional statements, and said reasoning component may determine a plan using a conditional statement. When the conditional statement is executed by said plan processing module, said plan processing module checks whether the condition of said conditional statement is fulfilled. In case the condition is fulfilled, i.e. met, the determined plan is further executed, otherwise an alternative plan is executed.

determined plans with an undefined length, i.e. an unknown sequence of information parts or statements, provided by an application. This means, that if an application provides a service that is repeated for an unknown number of times depending on user requests, said reasoning component may model this within said finite state machines with a single statement. In other words, even if the length of a plan is not known when the reasoning component determines a plan, said reasoning component does not need to take care of this, because a single statement is provided taking into account this uncertainty.

Further aspects of the invention regarding the performance of a plan comprise:

serving different tasks in parallel. This is enabled by particularly simple statements of said plan language (more details see below).

serving a task at a certain time, i.e. scheduling a task. A task can be provided by a device and/or application, and the invention makes it possible to schedule this task. For example, a video recorder (VCR) may provide the task "recording". The task "recording" may then be scheduled for a certain time, i.e. the video recorder will start recording at a predetermined scheduling time.

interrupting the performance of a task due to user's wish. This means, that a user is able to stop the performance of a task. For example, the user may have started recording a movie, and then decides that he does not wish to continue recording that movie. The invention enables the interruption of the recording in this case.

interrupting the performance of a task due to information given by applications and/or devices. This means, that an application and/or device may stop the performance of a task and/or plan. For example, if the user makes a telephone call and the connections is shut down by the person who has called, the device telephone must give some information to the module which triggers the interruption of the performance of the plan.

Advantageously, said method comprises: a planning stage, wherein said determined plan or at least one further plan is determined or said determined plan is modified by said reasoning component, an executing stage, wherein said determined plan and/or said at least one further plan is executed by said plan processing module, and at least one switching step for switching back and forth between said planning stage and said executing stage, in particular when processing a conditional plan or serving different tasks in parallel.

One aspect of the invention is therefore to serve said complex user request by a two-stage process.

1. In a first stage or planning stage the system is in a planning mode. In this planning stage, said reasoning component determines a plan, i.e. a determined plan. Therefore, in a first step within said planning stage, available devices with respect to the serving of a complex user request are determined using a device search algorithm. The device search algorithm operates on the external models of said devices and/or applications. In a second step within said planning stage, the reasoning component evaluates the internal states of the devices in order to determine said determined plan. Thereby, said reasoning component applies a state search algorithm using said internal models of said devices and/or applications. As mentioned above, said internal models are based on finite state machines using said plan language. The result of said planning stage is a determined plan comprising an ordered set of statements.

2. In a second stage or executing stage, the system is in an executing mode. In said executing stage, said plan processing module executes said determined plan. This means, each statement of said determined plan is processed. Each statement of said determined plan is evaluated and sent to the corresponding device and/or application. The device and/or application then executes the statement, i.e. changes its internal state accordingly.

An important aspect of the invention is that the system may switch back to the planning stage, when a conditional statement and/or e.g. a WAIT-statement or REPEAT_WHILE_PENDING-statement occurs within said determined plan. In other words, if said plan processing module processes a conditional statement, the system can switch back to said planning mode, e.g. for determining an alternative plan. After the alternative plan is determined, this further plan will be executed by said plan processing module. This concept of switching between the planning mode and the executing mode is part of a plan repair (cf. below).

Also, for the parallel serving of different tasks, the system may switch from the executing mode to the planning mode. If e.g. the plan processing module processes a WAIT-statement, i.e. e.g. said plan processing module waits for some results, the system may serve another complex user request and therefore switches back to said planning mode for determining a further plan. Said further plan is then processed by said plan processing module, and after said further plan has been processed, the system processes the previously executed determined plan.

Advantageously, within said method or said further method, said plan language comprises a WAIT-statement and said reasoning component plans at least one further plan in case said plan processing module is executing or previously has executed a WAIT-statement and is thus in a waiting state, wherein said at least one further plan is executed by said plan processing module, such that said at least one further plan is executed in parallel to said determined plan. It is also possible that said at least one further plan is loaded by said plan processing module.

In other words, using said WAIT-statement in a generated, i.e. determined plan indicates that the system and/or said plan processing module is waiting for some feedback or results of an application and/or device. While waiting, the system and/or said reasoning component is able to generate a second, i.e. further plan and execute it. This means, the WAIT-statement is related to the parallel execution of plans.

Preferably, within said method or said further method, said plan language comprises a REPEAT_WHILE_PENDING-statement that describes an undefined number of WAIT-statements, thus realizing a determined plan of an undefined length comprising an unknown number of statements. In other words, a REPEAT_WHILE_PENDING-statement models an undefined number of WAIT-statements, i.e. a loop of WAIT-actions or WAIT-statements. A REPEAT_WHILE_PENDING-statement thus repeats the specified action as many times as the request status of corresponding responses is "pending". For example, a request is send out to a device and/or application and the plan processing module is then in a waiting state. While in waiting state, the user may still ask the system to execute a complex user request. Consider e.g. a tourist navigation service. The user asks the system to be guided to a certain place. The system then sends a number of information parts. However, it depends on every single user request, how many responses will be sent. Therefore it is impossible to model the exact number of responses within the finite state machine. Instead, there is one transition in the finite state machine annotated with the REPEAT_WHILE_PENDING, i.e. with the REPEAT_WHILE_PENDING-statement, wherein in this example the REPEAT_WHILE_PENDING-statement has a parameter "informUser". This means, the complete statement including the parameter reads as: "REPEAT_WHILE_PENDING(informUser)". This means, as long as the navigation service sends informations marked with "pending", the system continues to inform the user. As soon as there is an information marked with "last", the system continues to perform the rest of the determined plan.

In principle, it is possible to execute more than two plans in parallel, if at least some of these plans contain WAIT-statements. After having performed one plan, the next one will be performed, in case the system or said plan processing module already sent a response.

From the above said, it is clear that two plans can be executed at the same time, i.e. in parallel. Given a first plan, e.g.

(action1,action2, . . . ,actionM,wait,actionN, . . . ,actionK), then action1 to actionM are performed and then the WAIT-statement. As long as the system, i.e. the plan processing module is performing WAIT, i.e. it is in a waiting state, a further plan can be generated and performed. After the further plan has been performed, the plan processing module goes back to the first plan and continues performing it, i.e. in the above example, actionN to actionK are performed. Thereby, none of the plans are actively interrupted or stopped. This means, a generated plan is completely performed or processed before generating and executing a new one. When executing said further plan, there are different cases. If the further plan also consists of a WAIT- or a REPEAT_WHILE_PENDING-statement, the plan will be performed up to this statement, and then the system, i.e. the plan processing module goes back to the first plan, i.e. the determined plan. If not, the further plan will be completely performed before going back to the first plan, i.e. the determined plan.

Advantageously, within said method or said further method, said reasoning component determines a conditional plan as determined plan by using at least one EXPECT-statement which corresponds to an expected feedback of a device and/or application, and said plan processing module receives a current feedback from a device and/or application when said at least one EXPECT-statement within said conditional plan is executed, wherein in case said current feedback corresponds to said expected feedback, said conditional plan is further executed by said plan processing module, and in case said current feedback does not correspond to said expected feedback, i.e. otherwise, an alternative plan is executed by said plan processing module. It should be noted that the planning algorithm, i.e. the algorithm performed by the reasoning component, comprises a depth-first search. It allows conditional and/or heuristic planning by using the EXPECT-statement of said plan language. A determined plan will be performed as long as the feedback of a device and/or application corresponds to the expected feedback. Otherwise the calculated, i.e. determined plan won't be performed any longer. Instead, an alternative plan will be performed. This alternative plan either already exists, i.e. is precalculated or will be generated based on the current states of the system and/or devices and/or applications, i.e. a plan repair is performed. The precalculated alternative plan may be loaded from a database.

In a preferred embodiment, within said method or said further method, said alternative plan is loaded by said plan processing module, or said alternative plan is newly generated by said reasoning component. In case said alternative plan is loaded from e.g. a database of predetermined plans, a plan repair is performed. This means, using said EXPECT-statement, a plan may be determined based on several conditions. Regarding said EXPECT-statement the following should be noted: The EXPECT-statement occurs at some point of a generated plan, i.e. the planning was already done. If the conditions stated within the EXPECT-statement are met, the generated is executed. If not, either a precalculated plan or a newly generated plan is executed instead of this part of the generated plan, i.e. the determined plan, which part follows after the EXPECT-statement. Using precalculated plans may save computing power, however, the system needs to know in advance which plans could be needed if the conditions are not met.

In a preferred embodiment, said reasoning component and/or said plan processing module comprise an internal state data base with a data base entry for each device, said data base entry being descriptive for a current state of a respective device, said plan language comprises a GOAL-statement describing a goal state of a certain device and/or application and a REACHED-statement for setting said data base entry of said certain device and/or application to said goal state, wherein, when said REACHED-statement is processed by said plan processing module, the data base entry for said certain device within the internal state data base is updated and set to said goal state.

Advantageously, said determined plan comprises said GOAL-statement followed by following statements followed by said REACHED-statement, wherein said GOAL-statement is processed by said plan processing module, and in case said certain device and/or application is already in said goal state, said following statements are skipped and said REACHED-statement is processed directly after said GOAL-statement, and in case said certain device and/or application is not in said goal state, said following statements are processed, and wherein said REACHED-statement is processed by said plan processing module thereby setting said data base entry for said certain device and/or application to said goal state.

Regarding said GOAL-statement and said REACHED-statement, the following should be noted: In case a device and/or application is already in said goal state, stated by the GOAL-statement, the following actions in the generated plan, i.e. determined plan until and excluding the next REACHED-statement are skipped. In case the device is not in the goal state, stated by the GOAL-statement, the execution of the generated plan is continued. The REACHED-statement and the GOAL-statement are part of the plan language and thus handled as parts of the plan. Processing a GOAL-statement, the plan processing module checks, whether a certain device is already in the goal state or not. Processing a REACHED-statement, the plan processing module updates the current state of the device under consideration to said goal state. This means, the internal state data base within the planning module, consisting of the current states of all the devices in the network, is updated. If a device and/or application, after having changed the state, sends the current state to the planning module, i.e. the reasoning component, the planning module checks against the internal data base. This procedure, however, is not related to the GOAL-statement or REACHED-statement.

The scope of the GOAL/REACHED-statement may be explained at hand of an example. For example, consider a tape drive of a video recorder, if the user wants to stop the tape drive, then the determined plan may look like:

[action1( . . . ), . . . ,actionN( . . . ),goal(tapedriveVCR,stop), action(stopVCR),reached(tapedriveVCR,stop)].

After the plan processing module has performed action1 to actionN, the system, i.e. the plan processing module checks whether the tape drive has already reached the state [tapedriveVCR,stop]. If this is the case, the action "action (stopVCR)" is not necessary anymore and will not be performed. In case no, the action "action(stopVCR)" will be performed. Finally, the system needs to be aware that the tape drive now has reached the state [tapedriveVCR,stop]. Therefore, the current state of the tape drive will be set to [tapedriveVCR,stop]. This is triggered by the REACHED-statement and this current state for the device, in the example the VCR, will be stored in said internal state data base.

A generated plan may comprise several goal states, for example a device first needs to be brought into State1 and then into State2. Then, the generated plan consists of "goal (State1), action1 . . . action k, reached(State1), goal(State2), action1, . . . , action t, reached(State2)". If the device is already in State 1, action 1 to action k are skipped, and the rest of the plan in order to reach State2 will be performed, i.e. the performance of the plan is not completely stopped.

Preferably, within said method or said further method, certain functionalities are described by virtual devices that are modeled by one or more respective finite state machines.

A virtual device does not correspond to a real, i.e. physical device. This means, certain services and/or tasks that are provided to a user may be described by virtual devices that are not physically existing. However, by using finite state machines for describing said virtual devices, these virtual devices may be handled and described in the same way as all other physical devices and/or real applications that are connected to said network. In other words, the concept of using virtual devices enables an easy and flexible including of new functions within the system. No algorithms and/or other components of the system, e.g. the plan processing module and/or the reasoning component need to be adapted when new virtual devices are included. This implies, that the determined plans may be based on virtual devices and the underlying functionality can be provided to the user and/or any real physical device.

The virtual devices are handled, i.e. modeled like any other device and/or application within the system. This means, they are modeled with a finite state machine and the transitions of these virtual finite state machines are annotated using said plan language. The modeling concept of virtual devices, i.e. the usage of annotated finite state machines for virtual devices to model functionalities like e.g. scheduling (cf. below) allows to combine virtual devices with any other functionality of any other real physical device and/or virtual device. Given the combination of virtual devices and others, there arise new functionalities. By using a virtual device, it is e.g. possible to schedule the recording of a film, programming a video recorder, but also scheduling of sending an email at a certain predetermined time.

Another advantage of an aspect of the invention is that the introduction of virtual devices allows to provide new functionalities. For example, a scheduling device (cf. below) allows to schedule the sending of an email. Without the scheduling device, an email may be only sent immediately. However, after the introduction of the scheduling device, it is possible to provide the function to send the email at a scheduled time.

Advantageously, within said method or said further method, said virtual devices comprise a scheduling device for providing a scheduling function within a determined plan. Said scheduling device or scheduler is thus used for fulfilling a user wish at a certain time, i.e. to start the recording of a video recorder at a certain scheduled time.

Preferably, within said method or said further method, said scheduling function is provided to said devices and/or applications of said network and thus enables the scheduling of tasks provided by said devices and/or applications of said network and/or the scheduling of a determined plan. In other words, by using a scheduling device, a scheduling function can be provided to any of said devices and/or applications of said network but also to other virtual devices. For example, it may be possible to schedule the time when recording of a video recorder shall be started. Or, the time when the heating of a house shall be raised may be scheduled using said scheduling device. Scheduling here means to schedule a user wish.

For example, when programming a VCR: "Programming a VCR" means "recording a film at a certain time X". Therefore, the user wish "recording a film" is scheduled to time X, i.e. at time X the planning module, i.e. reasoning component, generates a plan for "recording a film", which is executed immediately.

Advantageously, within said method or said further method, said virtual devices comprise a stopping device for providing a stopping function within a determined plan.

In an advantageous embodiment, within said method or said further method, said stopping function is provided to said devices and/or applications of said network and thus enables the stopping of tasks provided by said devices and/or applications of said network and/or the stopping of a determined plan. Using said stopping device, it is possible to stop devices and/or determined plans, wherein a plan may be determined in the regular way by said reasoning component. I.e., a stopping function is provided just like any other function of devices and/or applications and the description is again based on a finite state machine.

Preferably, within said method or said further method, said plan language and said determined plan comprises exclusively any or any combination exclusively of the following statements:

ACTION: instructing a device to perform a task;
WAIT: modeling that a device and/or application is in a waiting state;
REPEAT_WHILE_PENDING: modeling an infinite number of WAIT-statements;
EXPECT: in case an expected feedback is received from a device and/or application, said determined plan is continued to be executed, otherwise an alternative plan is executed by said plan processing module;
GOAL: in case a device is in a goal state that is indicated by said GOAL-statement, following statements are skipped until a REACHED-statement is reached, and in case said device and/or application is not in said goal state, the following statements are processed;
REACHED: updating an internal data base with the current state of a respective device and/or application;

thus enabling a simple description language regarding expressive power with a low complexity.

Because said plan language comprises exclusively the above mentioned statements, said plan language is very simple. In prior art systems in the planning domain, the planning language PDDL (Planning Domain Definition Language) is used. However, PDDL is a planning language to represent planning domains. Here, within the invention, the planning domain corresponds to the devices and/or services, i.e. instead of using a language like PDDL, annotated finite state machines FSM are used in order to represent the underlying domain. In that sense, said plan language is part of a representation language describing the internal models of devices and/or applications. Also, PDDL is a highly expressive planning language. For the applications within this specifications, this high expressive power is not necessary. In contrast, since high expressive power results in high complexity, the usage of PDDL would be a disadvantage with respect to runtime, i.e. computing time. In addition, PDDL is designed to represent the planning domain, but it is not extended for describing actual plans, i.e. it is not suited for determined plans in the sense of the invention.

Preferably, within said method or said further method, in case said reasoning component determines several possible plans for serving a received complex user request, said reasoning component selects said determined plan from said several possible plans depending on cost aspects for the user. In a preferred embodiment, it is also possible that the selection is based on quality aspects for the user. For example, when the user wants to watch a movie, there may be several data sources and/or several connections via which the movie can be obtained. For example, a movie might be obtainable via an internet connection with a high speed or via an internet connection with a low speed. When the high speed connection is chosen, the quality and cost for the movie is higher. When the movie is obtained via the slower internet connection, quality and cost may be lower for the user. There may be a predetermined setting by the user indicating that he wishes to watch movies at the lowest cost possible. In this case, if there are several plans determined by said reasoning component, one plan using a solution with a high cost and the other with a low cost, the plan is chosen as determined plan that creates the lowest cost possible for the user. Of course, it is also possible that the user may have requested to always watch movies in the highest possible quality. In this case, said determined plan is selected from said several possible plans, which determined plan enables the highest possible quality.

Advantageously, within said method or said further method, in case said reasoning component determines several possible plans for serving a received complex user request, said reasoning component selects said determined plan from said several possible plans based on a selection of the user and/or based on predetermined preferences. In a preferred embodiment, said several possible plans are therefore displayed to the user and the user selects his preferred plan. For example, the user may utter a request like "I want to watch the movie "Titanic" tonight." However, there may be several providers, providing the "Titanic"-movie. This means, there may be several possible plans for serving this request, which several possible plans are different in that different providers, i.e. media sources are included in the plans. The user may then select his favorite provider and the corresponding plan is thus selected by said reasoning component. Of course, the user may set predetermined preferences indicating his favorite provider. In this case, the reasoning component would select a plan based on these predetermined preferences.

According to another aspect of the present invention a dialogue system is provided which is capable of and which has means for performing or realizing the above-defined method or further method for serving complex user requests.

According to another aspect of the present invention a computer program product is provided which comprises computer program means adapted to perform and/or to realize above-defined method or further method for serving complex user requests and/or the steps thereof, when it is executed on a computer, a digital signal processing means, and/or the like.

According to another aspect of the present invention a computer readable storage medium is provided which comprises a computer program product as defined above.

The invention and advantageous details thereof will be explained by way of an exemplary embodiment thereof in the following with reference to the accompanying drawings in which FIG. 1 shows a prior art dialogue system;

Figure 6:
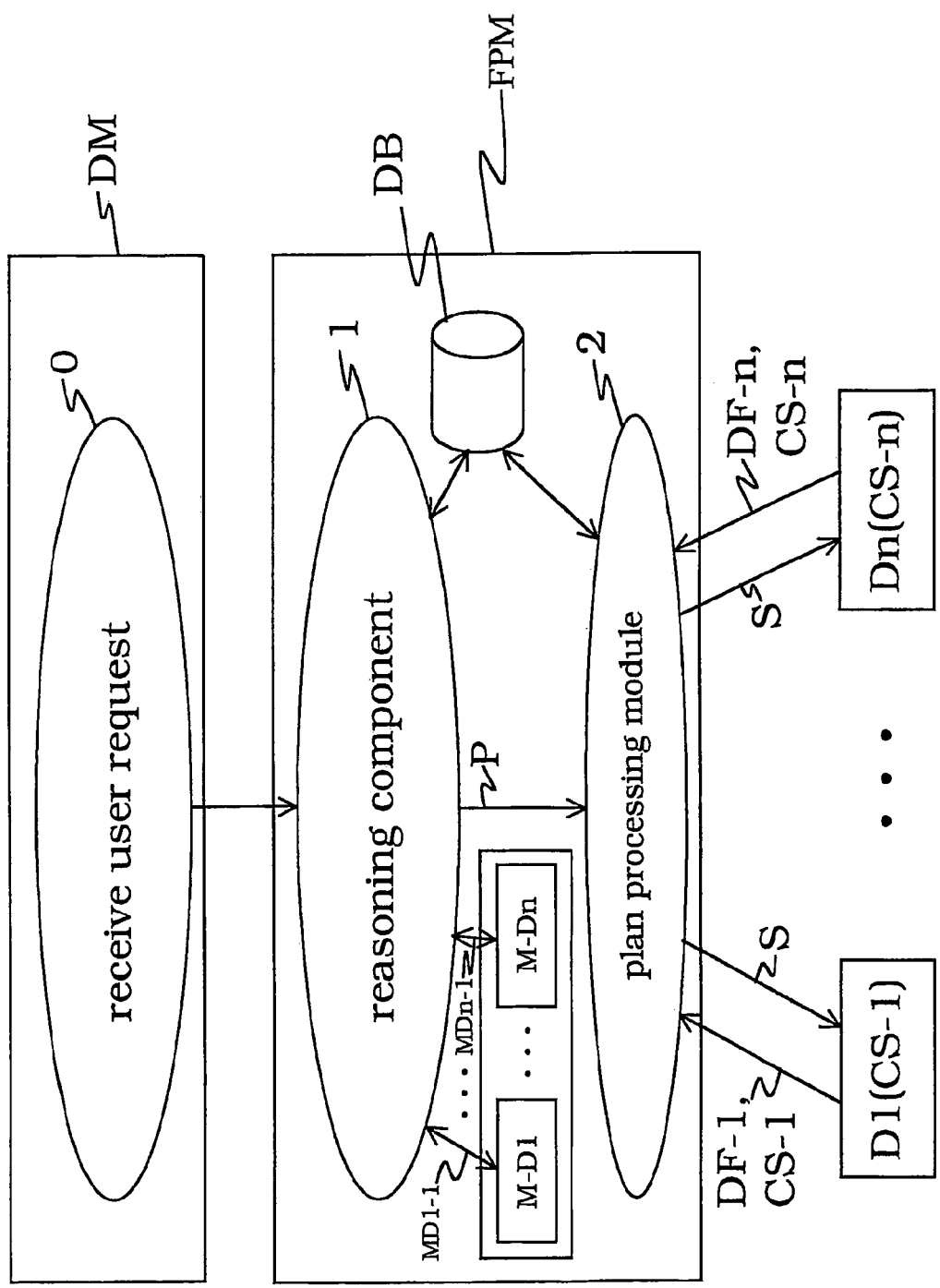
FIG. 6 shows a block diagram explaining the interaction of the reasoning component and the plan processing module.

FIG. 6 shows a block diagram according to which a dialogue manager DM receives a user request in an initial state 0. The received user request in the following also simply referred to as request is sent to a reasoning component 1 that is part of a function planning module FPM. Said function planning module FPM further includes a plan processing module 2, and an internal state data base DB for storing the current states of devices D1, . . . , Dn. The internal state data base DB can be accessed by said reasoning component 1 and by said plan processing module 2.

Said function planning module FPM further comprises device models M-D1, . . . , M-Dn of the devices D1, . . . , Dn. The device models M-D1, . . . , M-Dn are the abstract models of the devices D1, . . . , Dn, i.e. the device models M-D1, . . . , M-Dn comprise the internal models and external models of the devices D1, . . . , Dn.

Based on the received user request, the reasoning component 1 then determines a plan P. When determining a plan P, the reasoning component 1 uses the device models M-D1, . . . , M-Dn of the devices D1, . . . , Dn. This means, the reasoning component 1 accesses the device models M-D1, . . . , M-Dn via connections MD1-1, . . . , MDn-1. When determining said plan P, the reasoning component 1 may also take into account the current states of the devices D1, . . . , Dn. The current states of the devices D1, . . . , Dn are stored in said internal stage data base DB (cf. below).

The determined plan P consists of one or more statements. The determined plan P throughout this specification simply referred to as plan, is then sent to the plan processing module 2. The plan processing module 2 then executes the plan P by executing each statement S. A statement S may involve the action of a device. In this case, the plan processing module 2 sends a respective statement S to the corresponding device. E.g. in FIG. 6, the plan processing module 2 sends a statement S to device D1 and to Device Dn. In case the plan processing module 2 requires a feedback DF-1, . . . , DF-n from a device, the respective device provides a corresponding device feedback DF-1, . . . , DF-n. A device feedback DF-1, . . . , DF-n may also comprise a current state CS-1, . . . , CS-n of a device. For example, in FIG. 6, device D1 is in a state CS-1. In case the plan processing module 2 requested the current state CS-1 of device D1, the first device D1 provides the current state CS-1 to the plan processing module 2.

The current states CS-1, . . . , CS-n of the devices D1, . . . , Dn may be stored in said internal state date base DB by said plan processing module 2. Both, said reasoning component 1, and said plan processing module 2 may access said internal state data base DB when determining and/or executing a plan.

Said internal state data base DB thus provides the current states of every device D1, . . . , Dn. If a device has changed the state on its own, the device sends a statement, i.e. the current state CS-1, . . . , CS-n to the function planning module FPM which causes an update of the internal state data base DB, i.e. the data base entry for the respective device within said internal state data base DB is updated with the current state CS-1, . . . , CS-n of the respective device D1, . . . , Dn. While planning, i.e. while said reasoning component 1 determines a plan P, only the internal state data base DB is accessed in order to obtain the current state CS-1, . . . , CS-n of a specific device D1, . . . , Dn. This means, the reasoning component 1 accesses said internal state data base DB and performs the planning, i.e. determines the plan P, based on the information obtained about the current states CS-1, . . . , CS-n from said internal data base DB.

Figure 7:
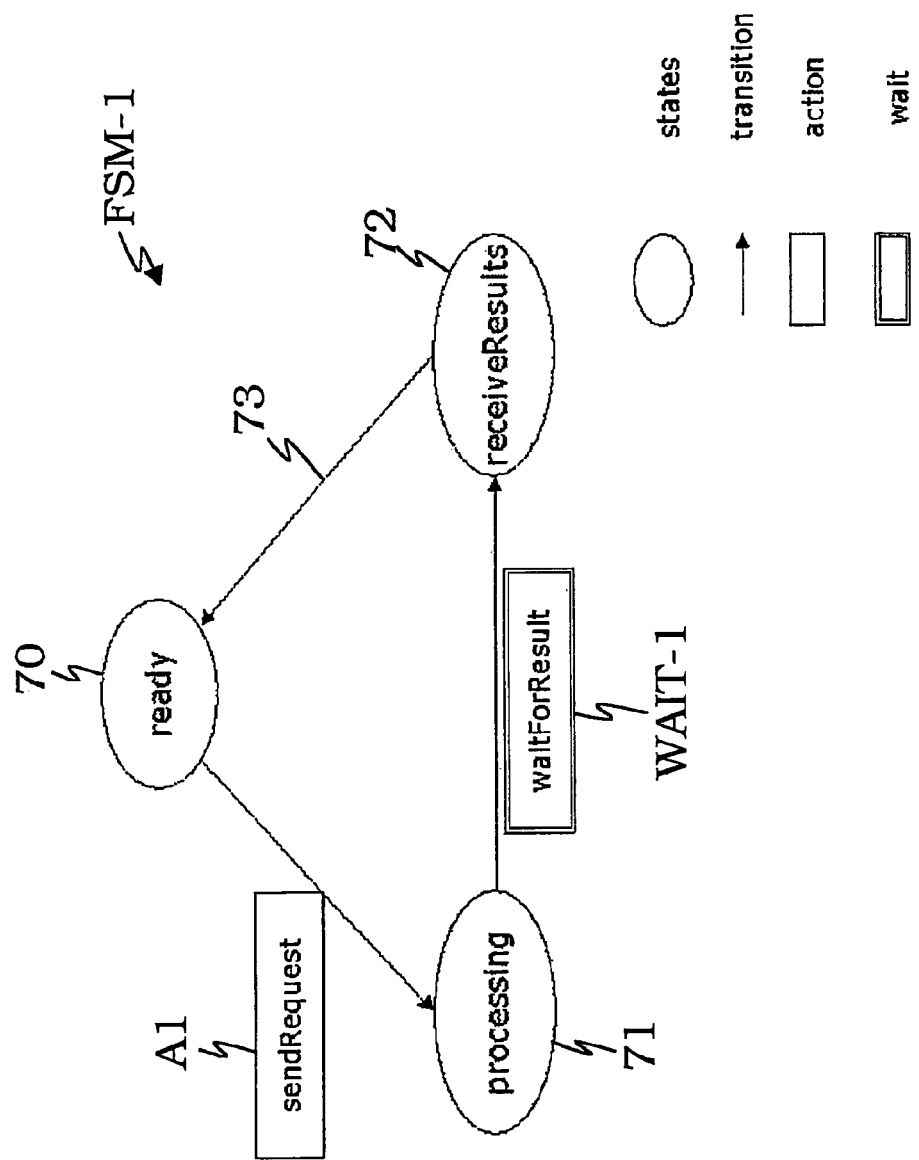
FIG. 7 shows a first finite state machine with a WAIT-statement.

FIG. 7 shows a first finite state machine FSM-1 corresponding to an electronic program guide EPG. The transitions of the first finite state machine FSM-1 are annotated with a first action command A1 "action(sendRequest)" and with a first WAIT-statement WAIT-1 "WAIT(waitForResult)".

In FIG. 7, a first finite state machine FSM-1 has a ready state 70, a processing state 71, and a receiving state 72. The transition from the ready state 70 to the processing state 71 is denoted, i.e. annotated with said first ACTION-statement A1. The transition from said processing state 71 to said receiving state 72 is denoted by said first WAIT-statement WAIT-1, and the transition from said receiving state 72 to said ready state 70 is denoted by a first transition 73. When the reasoning component 1 determines a plan P, it uses e.g. the first finite state machine FSM-1 of the electronic program guide EPG in order to serve a complex user request. For example, the user may have requested to record the movie "Titanic". Then, one part of the plan P may be to find out at what time the movie "Titanic" is played. Therefore, the first ACTION-statement A1 may be used. Until the electronic program guide EPG has not found the requested result, i.e. the time the movie plays, the function planning module FPM remains in a waiting state, i.e. the first WAIT-statement to WAIT-1 is performed. After having performed the WAIT-statement, the plan processing module 2 interrupts execution of the plan until the electronic program guide EPG provides the result, i.e. the plan processing module 2 is waiting.

Figure 8:
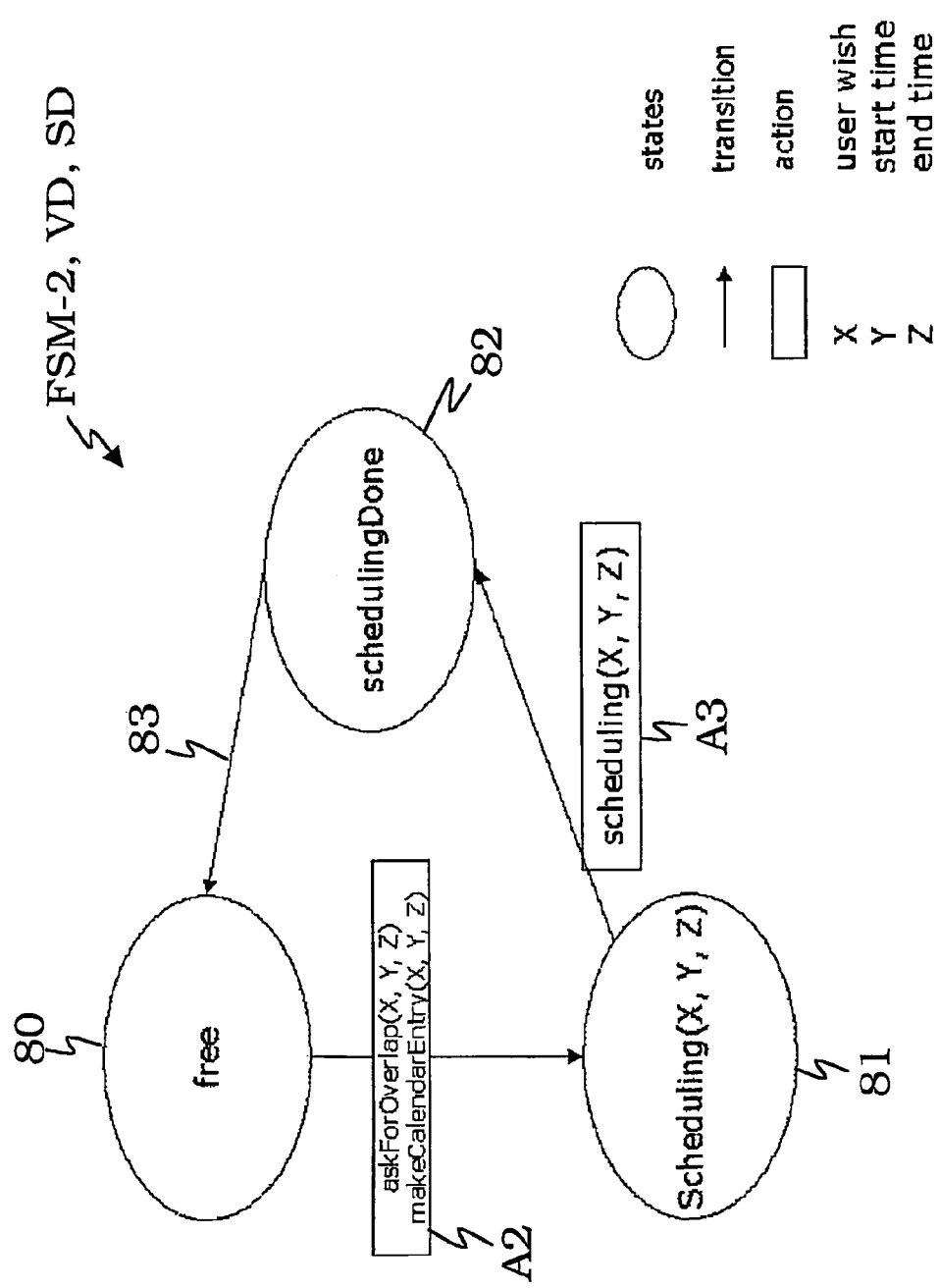
FIG. 8 shows a second finite state machine describing a virtual scheduling device.

FIG. 8 shows a second finite state machine FSM-2 describing a scheduling device SD. The scheduling device SD is a virtual device VD that does not correspond to an actual physical device.

The second finite state machine FSM-2 comprises a first free state 80, a scheduling state 81, and a done state 82.

The transition between said first free state 80 and said scheduling state 81 is annotated by a second action command A2. The transition between the scheduling state 81 and the done state 82 is denoted by a third action command A3, and the transition between the done state 82 and the first free state 80 is denoted by a second transition 83.

In the example of FIG. 8, the second action command A2 comprises the following actions:

askForOverlap(X, Y, Z); and makeCalendarEntry(X, Y, Z), wherein X denotes a user wish, Y denotes a start time, and Z denotes an end time. After the second action command A2 has been executed, the scheduling device SD goes into the scheduling state 81. Then, the third action command A3 is performed, that comprises a command, i.e. statement:

scheduling(X, Y, Z).

After this action has been executed, the scheduling device SD goes into the done state 82. Finally, the scheduling device SD goes back to the first free state 80.

Regarding the scheduling of a task, an example is the task "programming a video recorder VCR". The functionality "recording" is combined with the functionality "scheduling a task X". The process is then as follows:

1. The scheduling device SD, i.e. the device scheduler, causes the sending of the request "record(parameter)" to the reasoning component 1 at the time, when the recording should start.
2. The reasoning component then generates a plan, which is performed in order to fulfill this task.

As mentioned above, the plan for "recording a film" is only generated after the scheduling request has been received. The functionality scheduling causes the request "record the film" at the specified time, i.e. the request is sent to the reasoning component.

Regarding the scheduling device SD and all other following virtual devices, it should be noted that the scheduler is modeled with a functional model consisting of an external model and an internal model. However, FIG. 8 only shows the internal model of the scheduling device SD. This means, the modeling of the scheduling device SD is the same as for all other devices and applications of the network of devices. For more details on the modeling of devices, see European Patent Applications No. EP 01 128 163.1 and EP 03 010 834.4, which are both included by reference herewith.

Figure 9:
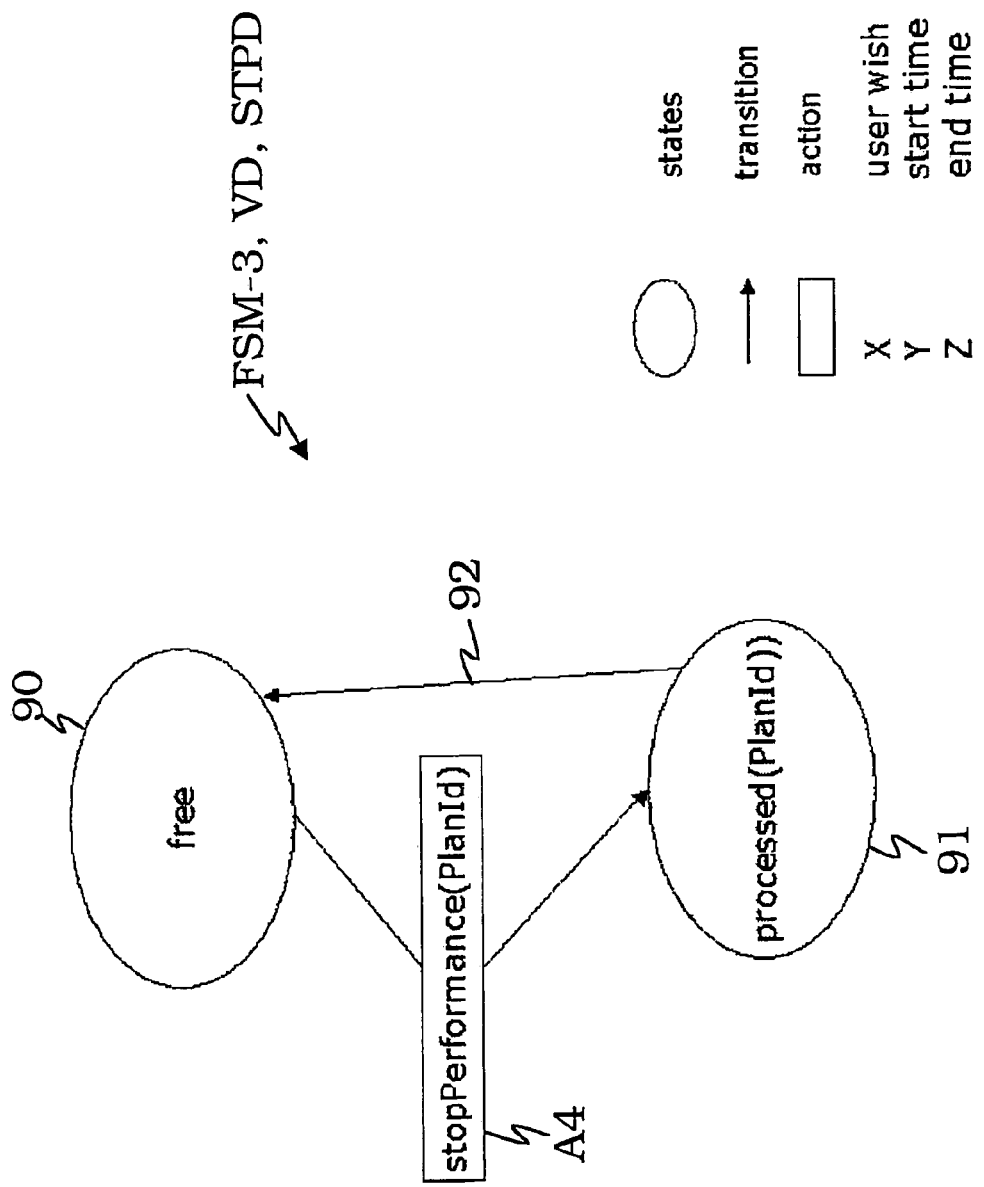
FIG. 9 shows a third finite state machine describing a virtual stopping device.

FIG. 9 shows a third finite state machine FSM-3 of a stopping device STPD. The third finite state machine FSM-3 consists of a second free state 90 and a stop processing state 91. The transition from the second free state 90 to the stop processing state 91 is annotated with a forth action command A4.

The forth action command A4 comprises the following command:
stopPerformance(PlanId).

Regarding the stopping device STPD, note that the stopping device STPD is modeled as a finite state machine like all other devices. An example, where the stopping device STPD is used, is again a tour guide application. The user might ask the system for guidance from point A to point B. Given this user request, the reasoning component generates a plan P, which includes receiving an undefined finite number of information parts and a final message, saying that the tour guidance is finished. Thereafter, the generated plan is being performed. However, after half of the way from point A to point B, the user might change his mind and he wants to stop the guided tour. This means, he asks the system to stop the guidance. The "stop"-request is handled as a new inserted user wish. In other words, the stop-request is handled as any other user request. However, at the point the user uttered the "stop"-request, the performance of the determined plan, i.e. the plan of guiding the user from point A to point B, is still running. Therefore, the determined plan needs to be interrupted. In order to do that, the stopping STPD is used.

In other words, the stopping device STPD allows the description of a stopping request by a user in the same easy and functional way by using a finite state machine just like all the other devices of the network are described. The usage of the stopping device STPD therefore enables a particularly easy and consistent way of describing a user wish, i.e. a user request wherein the user states that he wishes to stop a currently executed plan, i.e. a previously determined plan. It should be noted, that the stopping device STPD of FIG. 9 may also be used by an application. If an application provides some information to the planning component, i.e. the reasoning component 1, to which information causes the necessity to stop the performance, this can be achieved using the stopping device STPD.

Regarding the stopping of a plan, the following should be noted:
1. The user stops the tour guide: The user asks the system to stop the tour guide which is handled as a normal user request, i.e. a device is searched for in order to fulfill the wish and a plan is generated and finally performed. The device that is found that is found is the stopping device. The generated plan, i.e. determined plan thus comprises the action "stop Performance (PlanId)". This action, i.e. statement, causes the plan processing module 2 to stop the performance of the plan and the application to stop already requested services, if necessary. In case of the tour guide application, the plan processing module 2 stops and waits for the next piece of information and considers the generated plan as being performed. At the same time, the plan processing module 2 informs the tour guide application to stop sending information and finish the tour guidance.
2. An application stops a generated plan: As an example consider a telephone call. Imagine the line is interrupted either by the person being called or by any other technical reason. In this case, the generated plan cannot be performed as usual. Instead, the telecommunication device sends a status change information to the module, which then causes a stop request of the plan. This stop request is then handled by the reasoning component as described for the first case and the generated plan will be executed.

Figure 10:
FIG. 10 shows the parallel processing of two determined plans.

FIG. 10 shows the parallel execution of a determined plan P and a further plan FP.

The determined plan P corresponds to the plan "request of information" and comprises the following statements:
action(sendRequestNavigationService)
goal(navigationService, getInformation)
wait(results)
action(reportResults)
goal(navigationService, ready).

The further plan FP corresponds to the task of sending an email, i.e. a plan "send email" and comprises the following statements:
action(sendEmail)
goal(emailService, active)
wait(successfullySent)
goal(emailService, ready).

In the example of FIG. 10, the plan processing module 2 starts processing the determined plan P. However, after performing the ACTION-statement, and the GOAL-statement, a WAIT-statement follows, which in this example is the statement wait(results). This causes the plan processing module 2 to be in a waiting state. Therefore, the further plan FP may be performed by the plan processing module 2. This means, the above mentioned steps for sending an email are performed, i.e. the following statements are performed:
action(sendEmail)
goal(emailService, active)
Wait(successfullySent)
goal(emailService, ready).

After the further plan FP has been executed, the plan processing module 2 continues to execute the determined plan P by performing the following statements:
action(reportResults)
goal(navigationService, ready).

This means, the parallel processing of the plan "request of information" and the plan "send email" is performed by the following ordered sequence of statements:
1. action(sendRequestNavigationService)
   goal(navigationService, getInformation)
2. wait(results)
3. action(sendEmail)
   goal(emailService, active)
4. Wait(successfullySent)
   goal(emailService, ready)
5. action(reportResults)
   goal(navigationService, ready).

In the following further elucidations are given that may help a person skilled in the art to get a better understanding of the invention.

1 Introduction

Although human-machine interactions are ubiquitous, they are not always a very pleasing experience. An often cited example is how inconvenient and error-prone it is to program a video cassette recorder (VCR). Another example is that currently users have a lot of troubles, when they want to connect blue tooth devices. The main problem with most of the user interfaces is that the user has to think in terms of devices and services (play, record, . . . ). Instead, the user should be able to interact with a system in a natural way, as he would do with a human assistant. To give an example, the user might put a document on the table and simply say "send this to Mr. Green". In consequence, the system should deal with the devices and services for him. It should scan the paper with a document camera, find out how to reach Mr. Green by consulting an appropriate address book, transmit the image either to an e-mail client or a fax modem, possibly doing format conversion beforehand etc. The user in this case has a complex wish involving several devices and several actions per device. He wants simply his wish to be solved; he does not want to care about the individual devices or the action sequences to be carried out. Similar problems arise in the case of copying videos or combining EPG access and personal calendar. Note, that these tasks can only be solved by a system providing a central human-machine interface operating several devices.

Given a home network or personal area network, the problem addressed by the invention is to enable a flexible and intuitive control of an ensemble of devices and services with a single intuitive human-machine interface. The focus is on how complex user wishes can be served, and
how plug&play can be realized on the side of the dialogue system In order to solve these problems different aspects need to be considered:

A traditional dialogue system used for the control of devices usually consists of an input understanding part, a dialogue manager, and the devices, which are to be controlled. The simplest way to control the devices is to have a unique mapping of the user input to the appropriate control command. Given e.g. a speech input "CD play", it can be uniquely mapped to the "play"-command of a CD player. However, this approach does not allow to serve complex wishes like the above mentioned examples, since the user input for complex wishes cannot be uniquely mapped to a single control command.

In order to gain more flexibility with respect to adding new applications it is necessary to separate domain-dependent knowledge from domain-independent knowledge.

Separation of domain-dependent and -independent knowledge can be obtained by introducing an additional module serving as an interface between the dialogue manager and the devices to be controlled, including models of the devices. However, to serve complex user wishes it is not enough to consider models of single devices. Instead, some sort of reasoning on the provided services is necessary.

In prior art the use of pre-calculated plans for complex tasks is described. With this approach however, the user is limited to these tasks, where pre-calculated plans are available.

Concerning plug&play, there are existing physical solutions like Blue tooth and IEEE1394 (iLINK), which offer plug&play on a hardware level. This has also to be reflected in the human-machine interface since new devices have to be controlled through the human-machine interface.

In order to overcome these sort of problems within invention a multi-modal dialogue system is enhanced with a planning component, called function planning module. The function planning module consists mainly of a set of abstract models describing the functionalities of devices and services available in the network and a reasoning component. Using these abstract models the human-machine interface can infer how to control the available services and devices. Henceforth, the term "devices" instead of "devices, and services and/or applications" is used for reasons of brevity. This part of the description is organized as follows: First an overview about the function planning module is given, which is followed by a detailed description of the single parts of the reasoning component and a formal description of the concept. The next part focuses on the realization of the function planning module. Then a section about future work follows.

2 The Function Planning Module 2.1 The Function Planning Module: Overview

As described above, the focus is on serving complex user requests which may involve several devices. In order to handle requests like "please, record the film XYZ on Saturday" the system needs to find out which devices are necessary to serve the request,
how to control the devices.

For this purpose a planning component and appropriate data structures for planning are needed.

Figure 1:
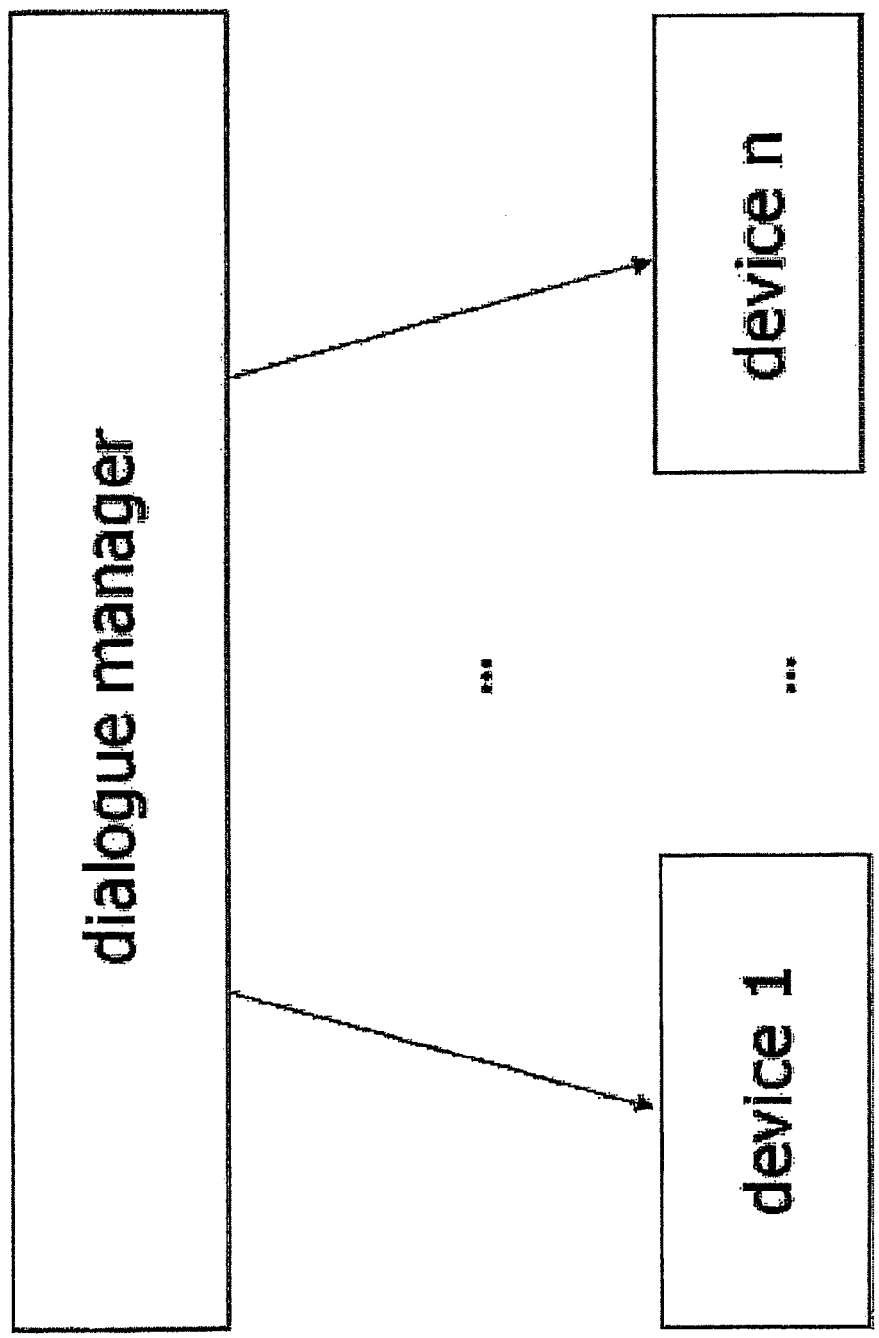
Figure 2:
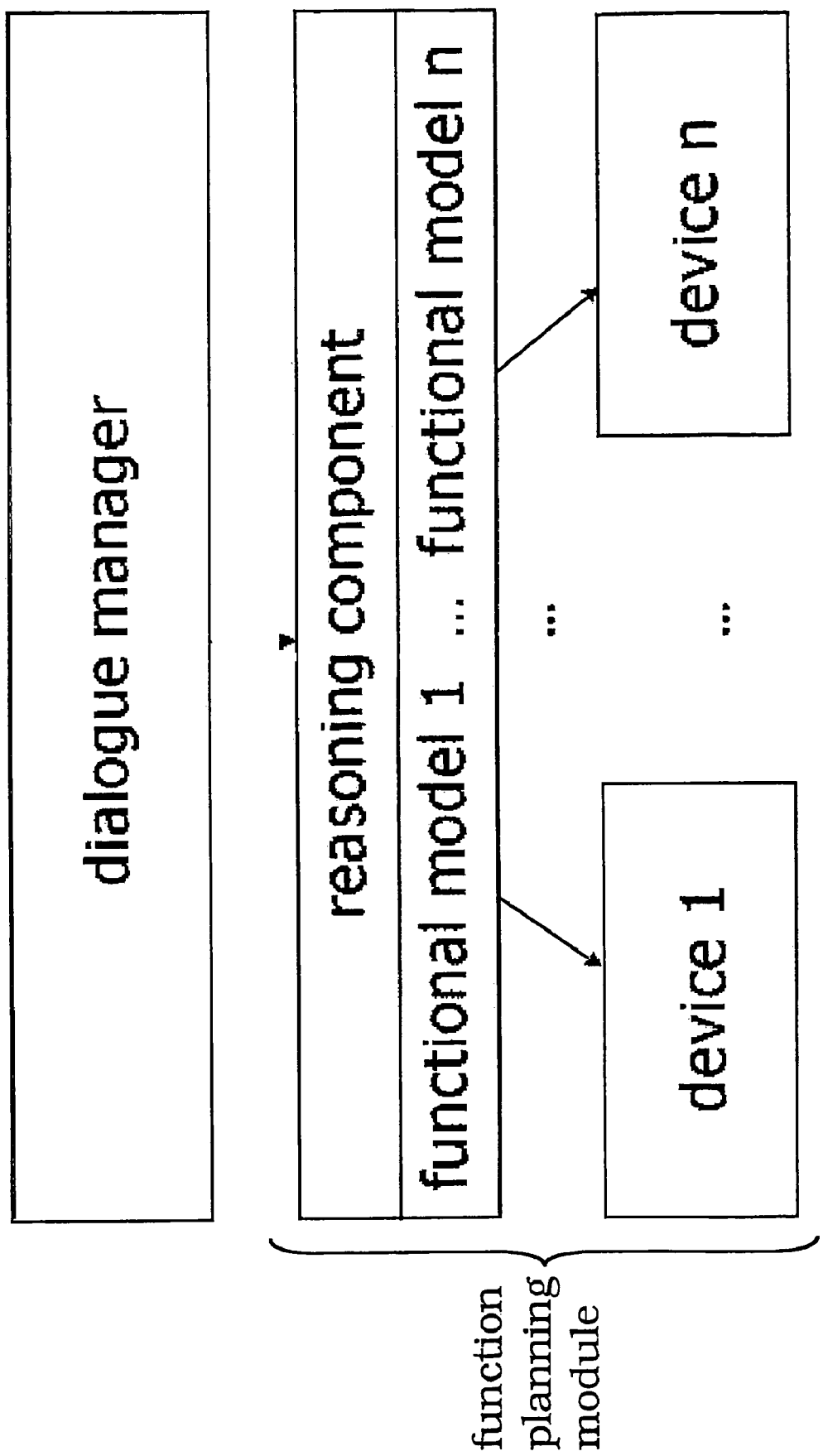
FIG. 2 shows a dialogue system with a function planning module.

Therefore, a new module is introduced, the so called function planning module, in order to solve the above described problems. The purpose of the function planning module is to allow the integration of the functionalities of several different devices and to support plug&play. In a traditional prior art dialogue system the devices which are to be controlled by the system, are controlled by the dialogue manager (see FIG. 1). In contrast the enhanced system (see FIG. 2) provides a sort of intelligent interface between the dialogue manager and the devices to be controlled, namely the function planning module. The function planning module consists of an abstract model of the functionalities of a device (so called functional model) for each device in the network,
a reasoning component,
a plan processor.

Furthermore, the function planning module is always aware of the current state of each device in the network.

Instead of controlling the devices directly from the dialogue manager, this allows to formulate the requests given by the dialogue manager on an abstract level. Based on this abstract request, the function planning module first calculates a plan to serve the request and then performs the plan.

The dialogue manager is therefore independent of the real devices, and robust against changes of them. The overall functionality of the given devices does not need to be known in the dialogue manager but it is deduced from the functional models of the given devices. This approach enables the system to serve complex user requests, and be flexible and robust against changes in the network of controlled devices, i.e. it supports plug&play.

In the following, we give a detailed description of the different parts of the function planning module, i.e. the functional model, the reasoning component, and the plan processor.

2.2 The Functional Model

The functional model is a two layered model. It consists of an external model and an internal model, where the external model describes the knowledge necessary to find appropriate devices and the internal model describes the single device in more detail. The external and internal model are connected, however they are used separately. This approach was chosen in order to reduce the search space.

External Model

Figure 3:
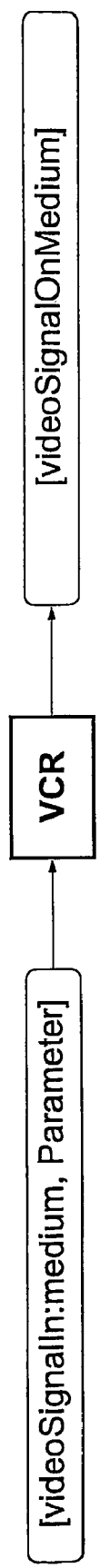
FIG. 3 shows an external model of a video recorder describing "recording"
Figure 4:
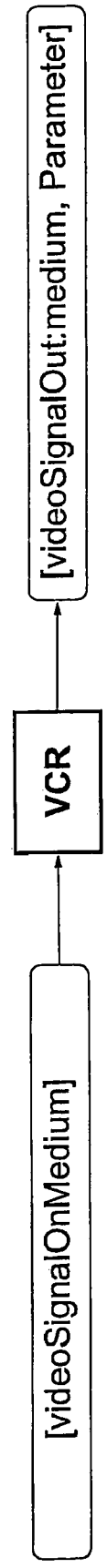
FIG. 4 shows an external model of the video recorder describing "playing"

The external model of a device models the knowledge, which is necessary but also sufficient to decide whether a device is appropriate to serve a given request or not. Furthermore the external models of the devices allow to draw conclusions on which devices are to be combined in order to fulfill a request. The external model of a device describes the input data and the output data of the device. It is modeled as a binary relation. Each external model of a device corresponds to a functionality of the device. Note, that a single functional model may consist of several external models, since one device may provide several functionalities. As an example consider a VCR, which provides the functionalities "recording" and "playback". The external models corresponding to "recording" and "playback" are depicted in FIGS. 3 and 4 respectively. However, a VCR as a single device is not capable to record a film. A second device, e.g. a tuner is necessary in order to provide the data to be recorded, i.e. the user wish "record the film" is a complex wish, such that the system needs to combine two devices, namely a tuner and a VCR, in order to fulfill the wish. This information is encoded in the external models of the tuner and the VCR.

Internal Model

The internal model of a device describes the possible states of the device and the actions and/or statements or commands which are necessary to bring the device from one state into another. Regarding the knowledge to be modeled, i.e. states and actions, finite state machines (FSM) are an appropriate means to build up an internal model.

Figure 5:
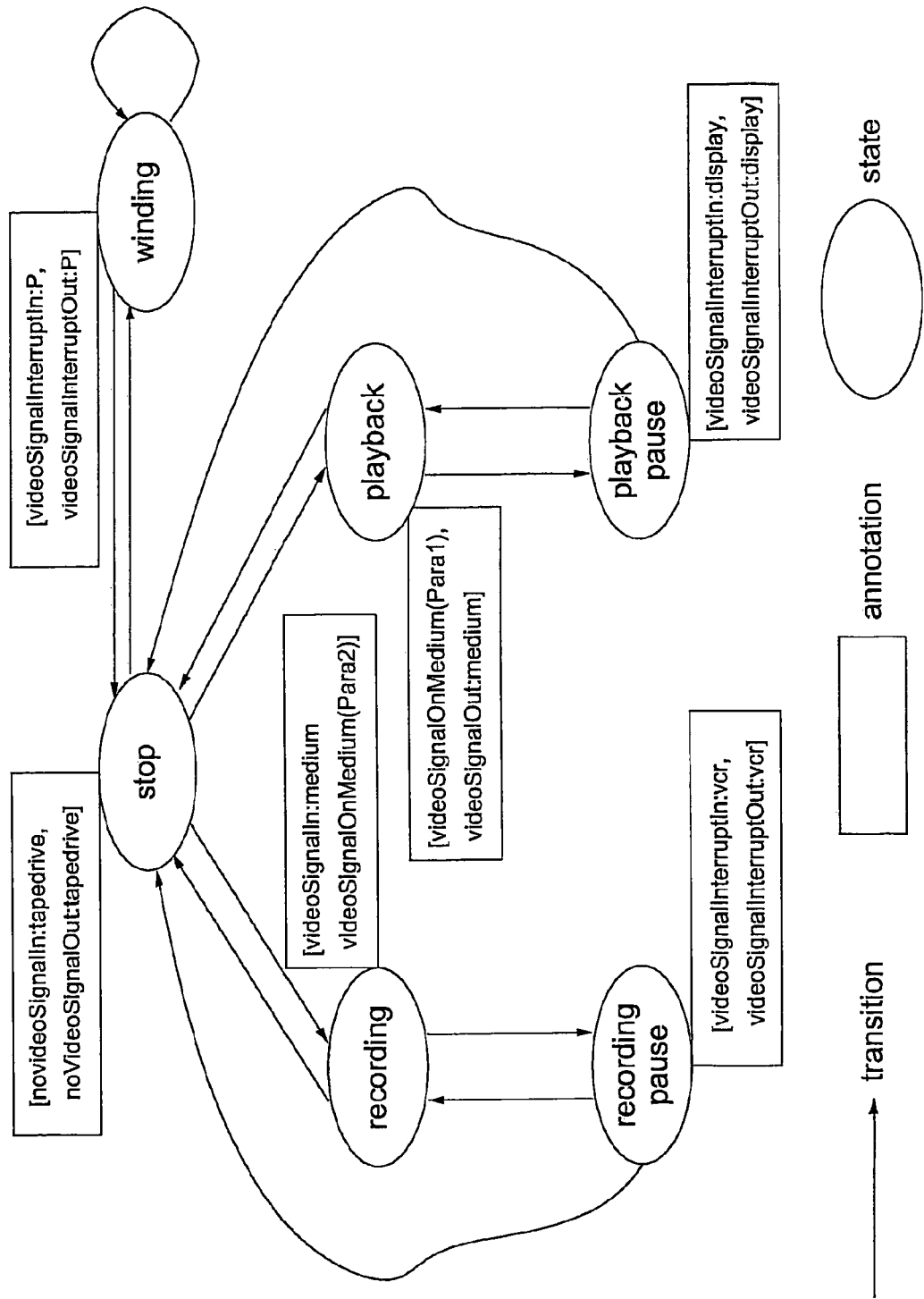
FIG. 5 shows an internal model of a video recorder.

The states in the internal model are partly annotated with incoming or outgoing data, respectively. This is an important point since these annotations ensure the connection between external and internal model of a device. In addition the states also might be annotated with pre- or post-conditions of each state. The internal model of a VCR is depicted in FIG. 5.

Formal Description of the Functional Model

The functional model can be formally described as follows:

Definition 1 (Functional Model) A functional model F is a tuple F=(D, S, T, i, o, pre, post) where D defines the external models and S, T, i, o, pre, post define the internal model.

D is a finite set of external models with $$D=\{(d_j^i, d_j^o) | d_j^i \in D^i, d_j^o \in D^o\}, D \subseteq D^i \times D^o$$

S is a finite set of states,

T: S×A→S is a transition function and A a set of actions (including the empty action)

i, o, pre, post are functions, which informally spoken map additional information to a state s∈S. They are defined as follows, where $\epsilon$ is the empty element:

i: $S \to D^i \cup \{\epsilon\}$ i: $s \mapsto d^i$ o: $S \to D^o \cup \{\epsilon\}$ o: $s \mapsto d^o$ Let F={$F_1, \ldots, F_n$} be a finite set of functional models with $F_i=(D_i, S_i, T_i, i_i, o_i, pre_i, post_i)$, i=1, . . . , n and F∈F, F=(D, S, T, i, o, pre, post).

Let $D^i = \bigcup_{j=1}^{n} D_j^i$ and $D^o = \bigcup_{j=1}^{n} D_j^o$.

Then pre and post are defined as pre: $S \to P(D^i \times D^o) \cup \{\epsilon\} \times \{\epsilon\}$ pre: $s \mapsto \{(d_j^i, d_j^o) | j=1, \ldots, l, d_j^i \in D^i, d_j^o \in D^o\}$ post: $S \to P(D^i \times D^o) \cup \{\epsilon\} \times \{\epsilon\}$ post: $s \mapsto \{(d_j^i, d_j^o) | j=1, \ldots, k, d_j^i \in D^i, d_j^o \in D^o\}$ Note, that the definitions of i and o only refer to the external models which are part of the functional model to be defined, whereas pre and post refer to the external models of all other functional models under consideration. Note furthermore, that the definition of pre- and postconditions, namely pre and post, corresponds to the definition of the external models.

2.3 The Reasoning Component

Each of the devices of the given network is modeled by its functional model. In order to use this knowledge the function planning module includes a reasoning component. This is necessary, since given a complex user request and given a network of devices, the following steps need to be executed in order to serve the user request:

1. Find out the device/devices which are necessary to perform the request.
2. Find out how to combine and to control the devices, i.e. generate an appropriate plan of actions to be executed.

Using the functional model of each device in the given network, the reasoning component first searches for the necessary devices and then generates a plan of actions for every device, which is involved.

The functional models allow to describe how devices can to be combined. This is done via the input and the output data of each device. Furthermore it is possible to describe a temporal order in which the devices are to be controlled. This is done by formulating pre- and post-conditions of single states of a device. Let us have a closer look to the algorithms.

In a first step a complex task T is mapped to a tuple ($d_T^i$, $d_T^o$)∈$D^i \times D^o$ (see definition 1). Let $$\bigcup_{j=1}^{n} D_j$$

be the set of all external models which are currently available. Then, using the representation ($d_T^i$, $d_T^o$) of the task the device search algorithm returns a set of external models $D^T$ of the necessary devices $$D^T \subseteq \bigcup_{j=1}^{n} D_j, D^T = \{(d_T^i, d_1^o), \ldots, (d_j^i, d_T^o)\}.$$

There are two cases to distinguish:

1. $|D^T|=1$, i.e. one single device is returned and planning starts and ends with this single device.
2. $|D^T|>1$, i.e. an ordered set of external models is returned. Each model uniquely corresponds to one device. And for each device the planning algorithm is performed as will be described for case 1.

Case 1: Given $D^T$ and the internal model of the device, during the next step the initial and the final state of the device is searched for. This search is based on the annotation functions i and o, which establish the connection between external models and the appropriate states of the internal model. As mentioned before the functional model also includes the knowledge of the current state of each device. Therefore at that point the system knows about the current, the initial, and the final state to be reached by the device.

Thus, the next step is to search for a path from the current to the initial to the final state in the internal model of the device. Since the transitions of the internal model of a device are annotated with actions, a sequence of actions, i.e. a plan is returned.

While searching for a path (i.e. a plan), pre- and post-conditions of the states are checked. Informally spoken, the pre- and post-conditions model the necessity of using further devices and how to use them. Since pre- and post-conditions are formulated like the external models (see definition 1), the same planning algorithm as described here is applied to fulfill them, which returns additional plans. These additional plans, corresponding to other devices, which are necessary to fulfill the given complex task, finally are integrated in the overall plan.

Case 2: See above.

It should be pointed out that the concept described above allows two possibilities to model the necessity of using several devices. First, it can be modeled by mapping the complex task to $(d_T^i, d_T^o) \in D^i \times D^o$, such that the device search algorithm returns an ordered set of external models (and also devices) as described above. Secondly, the concept of pre- and postconditions allows to model a more flexible temporal order.

2.4 The Plan Processor

As described above the reasoning component generates a plan, consisting of a sequence of actions. In order to fulfill a requested user wish, the generated plan needs to be executed. This is done by the plan processor, see next section, in particular section 3.3.

3 Realization in the Prototype

The function planning module was realized as a prototype system. It provides an intelligent interface between the dialogue manager (called action planning module), and the application interface of the devices. For the current realization these devices are loudspeakers, microphone, video cassette recorder (VCR), television, document camera, telephone, telefax, biometric authentication, address book, calendar, e-mail, car navigation, pedestrian navigation, and an internal scheduler. According to the concept described above the implementation of the planning module consists of (i) the functional models (i.e. the external and the internal models) for each device, which contain information about the basic functionalities of the devices and about the commands which are required to invoke them, (ii) a representation of the current state of each device, (iii) a reasoning component, which involves a device search algorithm and a planning algorithm, and (iv) a plan processor, which executes the generated plans.

In the following sections firstly the processing flow will be described. Secondly, the plan language, which is used in the functional models, is explained in detail. Finally, the main features of the planning algorithm and the plan execution are presented.

3.1 Processing Flow

As already mentioned the function planning module provides an intelligent interface between the action planning module and the devices. In the following the processing flow of requests issued by the action planning module will be described.

The action planning module requests an abstract and complex user wish to be fulfilled by the function planning module. The planner of the function planning module generates a plan to serve the request. It starts off from the current state of the devices and finds a path through the functional models that yield a configuration which provides the requested functionality. The path determines a sequence of commands which define the actual plan. Its execution is controlled by the plan processor.

The interaction between the function planning module and the devices is based on a command and response mechanism where the initiative always lies by the function planning module. As a consequence, devices can only change their state according to the functional model, if they can relate the change to a command issued by the function planning module. Note, that this does not mean that there is a one to one correlation between commands and state changes. A single command can also trigger a sequence of changes. Changes of states are reported to the action planning module only if there are according definitions in the functional models.

Because of the abstraction from specific devices, it is hidden from the action planning module which devices are involved in serving a particular request and how they are controlled. Nevertheless, we can distinguish between three complexity classes of plans within the function planning module. Many requests can be served by just sending one command to one device, e.g. looking up an entry in the address book. Some requests can be served by one device, but more than one command is needed. This is the case for biometric authentication: if an authentication method for a particular user is requested, the function planning module first checks whether that method is available for that user. If the test has been positive, it sends the command to initialize that authentication method. Otherwise the whole request is rejected.

The most complex treatment is required by those requests that are served by a couple of devices which need to interact in a well defined way. Such a complex request is for example to program a VCR. It involves the internal scheduler, the calendar application, a tuner, and the VCR. The programming request contains a time interval specifying when the recording procedure should be activated and information about the channel to be recorded. The function planning module checks by requesting the calendar application whether the VCR is programmed for the given time interval. If not, the request can be served. The scheduler is instructed to activate the recording procedure at the requested time interval with the given parameters. In order to carry out the recording procedure the function planning module looks for an appropriate TV-signal tuner, switches it to the specified channel and then instructs the VCR to record the signal from the tuner.

3.2 Plan Language

The plan language is used to annotate the transitions of the internal model of a device. These annotations model the actions which have to be carried out successfully to pass the transition. The plan language consists of the following statements:

action
wait
repeat_while_pending
expect
goal
reached action models the actions to be taken in order to fulfill a complex wish. wait models the necessity of feedback of a device, expect is comparable with wait, but depending on the feedback of a device the performance of the calculated plan will be performed, aborted, or alternative plans will be generated and performed. repeat_while_pending simulates a self-transition within a FSM, i.e. repeat_while_pending is a loop of the very same sequence of actions. It causes a repetition of the specified actions as many times as the application involved informs the function planning module that it is still working on the current request, i.e. the status of the request is pending. While processing a multiple response the current state of the device is the one before the transition annotated with a repeat_while_pending statement. The repeat_while_pending statement was introduced, since the system needs to handle requests with an unknown number of responses (e.g. navigation service). Multiple responses with a fixed number of responses can be modeled with a fixed number of wait statements. "goal" and "reached" is used for comparing the current state of the device while performing a plan and the state based on which the plan was calculated. This is necessary since it might happen that some devices change their states independently during the performance of a plan. If so, the calculated plan must be updated (plan repair).

A generated plan consists of a sequence of statements in the plan language. The length of a plan is defined as the number of statements in the plan. The length of a plan is always a finite natural number.

3.3 Planning and Plan Processing

The planning algorithm and the plan processor implemented in the system allow conditional planning, parallel processing, scheduling a task, and interrupting the performance of a task. These features are described in this section.

The planning algorithm comprises a depth-first search. It allows conditional/heuristic planning by using the expect statement of the plan language. A generated plan will be performed as long as the feedback of a device is the one as expected. Otherwise the calculated plan will not be performed any longer. Instead an alternative plan will be performed. This alternative plan either already exists, i.e. is pre-calculated or will be generated based on the current states of the system and devices, which are involved (plan repair). As a simple example consider a biometrics application. The generated plan is based on the expectation that the authentication is successful. This is modeled via an expect statement. If it is not successful, the generated plan is aborted, and a pre-calculated plan is performed in order to inform the user about the rejection.

The system provides some services, which last over a certain time period like e.g. the navigation service. Using such a service the user still should be able to request other services from the system. In order to do that the function planning module has the capability to serve different tasks in parallel. Given a task, the reasoning component calculates a plan to serve the task. If at some point the performance of the plan depends on some feedback of a device, the calculated plan is stored as long as the system is waiting for feedback. While waiting for feedback the system is able to serve other user wishes, i.e. the reasoning component calculates another plan and the plan processor is executing the calculated plan. In this case the plan processor is performing two plans in parallel. As an example consider a tour guide application, which provides information to the user during some time. While still using the tour guide the user wants to call a friend, which is another task, performed by the system. Without interrupting the tour guide the user is able to call and continue using the tour guide after finishing the telephone call.

Another feature of the function planning module, which is realized in the SmartKom system is the possibility to serve a task at a certain time, i.e. scheduling a task. For this purpose the function planning module contains a scheduler, which is regarded as an additional virtual device. This implies that the scheduler is modeled with a functional model, consisting of an external and an internal model, exactly like all the other devices and applications controlled by the system. Based on this concept, scheduling a task is modeled as a functionality, which arises by using one or several devices together with the scheduler. As an example consider the task 'programming a VCR'. The functionality 'recording' is combined with the functionality 'scheduling a task X'. The process is as follows: Device scheduler causes sending the request 'record(Parameter)' to the function planning module at that time, when the recording should start. As usual the function planning module then generates a plan, which is performed in order to fulfill this task.

Plans can be interrupted before they have been executed completely. The possibility of interruption has to be defined explicitly in the functional models by introducing extra states and transitions. Those extra transitions bring the according device into the original state. (By original state we mean the state which the device was in before the execution of the plan started.) Furthermore they define actions that take the rest of the plan from the agenda and if necessary, also bring other devices into their original state.

4 Further Aspects

Further aspects of the invention include several topics. Planning and performing a plan within the function planning module could be refined and enhanced with additional features. The existing concept of the function planning module supports plug&play.

Planning and performing a plan are implemented as two subsequent procedures. Making them interacting with each other enhances the functionality of the function planning module. If a device reported a change of state, the plan processor should check the consistency of all plans with respect to that updated state. If necessary, an inconsistent plan should be substituted by a new plan calculated by the reasoning component. As an effect the devices would gain the possibility to change their state autonomously. Furthermore, this change would enable self transitions in the functional model.

The interruption of plans is realized by extra states and transitions in the functional model. It is important in this context, that a plan can be interrupted and discarded at any point and that its effects are taken back automatically, so that the original states of the devices are restored.

In a complex network of devices and application a given user request might be accomplishable in several ways. First of all, the function planning module could generate alternative plans representing alternative solutions. These solutions either could be presented to the user, such that the user could choose the solution he likes the best. Or, alternatively, the actions, which are the components of the generated plans could be annotated with costs. Depending on the calculated costs of a generated plan, the system itself decides for the most appropriate plan to be executed.

When designing the function planning module one of the goals was to support plug&play. This caused a strict separation between the functional models of devices and any reasoning component, such that any device can be enhanced with its functional model and plugged into the network. However, in order to support plug&play within a network of devices controlled with a multi-modal dialogue system, the system does not only need to know about functionalities of a given device but also e.g. about words and pronunciations the user can use in order to ask for additional functionalities. Therefore additional information is added to the functional models of the devices.

Also, the following elucidations may help to get a better understanding of aspects of the invention:

The problem addressed by the invention is to enable a dialogue system to serve complex user requests. Instead of controlling devices in a network of devices/applications the user is allowed to ask the system to serve complex tasks, which may include the use of several devices. The functionality of each device is described by a Finite State Machine (FSM). A reasoning component (planner) is working on these FSMs. In order to provide an intuitive usage of the system the planner as well as the component which performs the generated plan need to be quite flexible. The following features are integrated:

Planning:
Conditional Planning
Serve tasks, including an unknown sequence of information parts, provided by an application
Performance of the Plan:
Serving different tasks in parallel
Serving a task at a certain time, i.e. scheduling a task
Interrupt the performance of a task due to user's wish
Interrupt the performance of a task due to information given by applications The invention enables a dialogue system to serve complex user requests. Instead of controlling devices the user is allowed to ask the system to serve complex tasks, which may include the use of several devices. The functionality of each device is described by a Finite State Machine (FSM). A reasoning component is working on these FSMs. In order to provide an intuitive usage of the system the reasoning component allows the following:

Planning:
1. Continuation of the performance of a task depending of the feedback of the applications involved (Conditional Planning).
2. Serve tasks where the user receives an unknown sequence of information parts, provided by an application.

Performance of the Plan:
1. Serving different tasks in parallel
2. Serving a task at a certain time, i.e. scheduling a task
3. Interrupt the performance of a task due to user's wish
4. Interrupt the performance of a task due to information given by applications State of the art planning systems either are designed for domain independent planning or special applications. For domain independent planning a de facto standard language (PDDL) has been developed.

PDDL is a de-facto standard language for the encoding of the planning domains. It is invented for the use of domain independent planning and its expressive power is rather high. For the invention this is not needed. In contrast, a high expressive power results in a high complexity which is a disadvantage for the applications of the invention. Furthermore, PDDL is not yet extended for describing the actual plans.

The only existing dialogue system, which incorporates a planning system is the EMBASSI system. The EMBASSI system uses an existing planning system, namely UCPOP (UCPOP: A Sound, Complete, Partial-Order Planner for ADL), which is not explicitly adapted to the special needs of the application as described above, e.g. UCPOP does not allow conditional planning nor plan repair.

Aspects of the invention include a plan language, a plan algorithm and a perform algorithm. The plan language is used to annotate the transitions of the FSM, which models an application. The plan language consists of action
wait
repeat_while_pending
expect
goal
reached.

action: models the actions to be taken in order to fulfill a complex wish.
wait: models the necessity of a feedback of an application.
expect: is comparable with wait, but depending on the feedback of a device the performance of the calculated plan will be performed, aborted, or alternative plans will be generated and performed.
goal/reached: is used for comparing the current state of the device while performing a plan and the state based on which the plan was calculated. This is necessary since it might happen that some devices change their states independently during the performance of a plan. If so, the calculated plan must be updated (plan repair).
repeat_while_pending: see above.

A generated plan consists of a sequence of statements in the plan language. The length of a plan is defined as the number of statements in the plan. The length of a plan is always a finite natural number. However, the length of a plan is not necessarily fixed. This is possible, since an undefined finite number of repetitions of a wait statement in the generated plan is allowed.

In FIG. 7 a finite state machine FSM of an electronic program guide EPG is depicted. The transitions of the FSM are annotated with one action (sendRequest) and one wait statement (waitForResult).

Planning Algorithm:

The planning algorithm comprises a depth-first search. It allows conditional/heuristic planning by using the expect statement of the plan language. A generated plan will be performed as long as the feedback of a device is the one as expected. Otherwise the calculated plan won't be performed any longer. Instead an alternative plan will be performed. This alternative plan either already exists, i.e. is precalculated or will be generated based on the current states of the system and devices, which are involved (plan repair). As a simple example consider a biometrics application. The generated plan is based on the expectation that the authentication is successful. This is modeled via an expect statement. If not, the generated plan is aborted, and a precalculated plan is performed in order to inform the user about the rejection.

The planning algorithm further allows to generate plans with unknown length as defined above. This is necessary in order to serve tasks, where the user receives a sequence of unknown length of information parts, provided by an application. In the generated plan this is modeled as a repetition of a wait statement, where the number of repetitions is not fixed. As an example consider a tour guide application. Given the request to be guided from A to B, the number of guidance information during the tour, provided by the system, is not fixed. Therefore it is not possible to calculate a plan, which describes explicitly each single feedback of the tour guidance application. Instead there is a variable in the calculated plan, which models the unknown number of feedback of the application. Given the FSM modeling the tour guide application, the transition describing feedback of the tour guidance application is annotated with an unknown number of wait statements. This causes an unknown number of wait statements in the generated plan, which is calculated from the annotations of the transitions in the FSM.

Given the FSM of the application, the application remains in the very same state as long as there are information parts expected. The information parts sent by the application are annotated with a so-called status tag. This tag says whether the information part is the last one or an intermediate one. Only if the last information part is sent by the application, the performance of the calculated plan continues.

Perform Algorithm:

Serving Different Tasks in Parallel:

Given a task, the reasoning component calculates a plan to serve the task. If at some point the performance of the plan depends on some feedback of a device/application, the calculated plan is stored as long as the system is waiting for feedback. While waiting for feedback the system is able to serve other user wishes, i.e. the reasoning component calculates another plan and the performance component is performing the calculated other plan. In this case the performance component is performing two plans in parallel.

As an example consider a tour guide application, which provides information to the user during some time. While still using the tour guide the user wants to call a friend, which is another task, performed by the system. Without interrupting the tour guide the user is able to call and continue using the tour guide after finishing the telephone call.

Serving a Task at a Certain Time, i.e. Scheduling a Task:

The concept is to consider a scheduler as an additional device. This implies that the scheduler is modeled with a functional model, consisting of an external and an internal model, exactly like all the other devices and applications controlled by the system. See patent applications no. EP 01 128 163.1 and no. EP 03 010 834.4. for details, that are included by reference herewith.

In FIG. 8 the internal model of the scheduler is depicted. Based on this concept, scheduling a task is modeled as a functionality, which arises by using one or several devices together with the scheduler. As an example consider the task 'programming a VCR'. The functionality 'recording' is combined with the functionality 'scheduling a task X'. The process is as follows: Device scheduler causes sending the request 'record(Parameter)' to the planning module at that time, when the recording should start. As usual the planning module then generates a plan, which is performed in order to fulfill this task.

Interrupt the Performance of a Task Due to User's Wish:

A virtual device is used, which stops the performance of a calculated plan. This virtual device is modeled as a finite state machine like the other devices. In FIG. 9 the internal model of the 'stop'-device is depicted. As an example again consider the tour guide application. The user might ask the system for guidance from A to B. Given this request, the planner generates a plan, which includes receiving an undefined finite number of information parts and a final message, saying the tour guidance is finished. Thereafter the generated plan is being performed. However, after half the way the user changes his mind and wants to stop, i.e. he asks the system to stop the guidance. This 'stop'-request is handled as a newly inserted user wish. However at this point the performance of the generated plan serving the tour guide request is still running. Therefore the plan needs to be interrupted. In order to do that, the 'stop'-device is used.

Interrupt the Performance of a Task Due to Information Given by Applications:

As described above a virtual device is used to stop the performance of a calculated plan, if the user wants to stop the performance. If an application provides some information to the planning component, which causes the necessity to stop the performance, the same virtual stop-device is used.

The invention has explicitly been developed for advantageously being used within a multimodal dialogue system to serve complex user requests within a network of applications. The planning and performance component needs to be incorporated into the dialogue system. In a prior art system, the EMBASSI system, an existing planner (Weld, D. and Penberthy, J., "UCPOP: A Sound, Complete, Partial Order Planner for ADL", Proc. of International Conference on Principles of Knowledge Representation and Reasoning, 1992) is chosen and integrated.

Advantageous differences between the EMBASSI system and this invention are as follows:

The invention is kept as simple as possible in terms of expressive power in order to reduce the complexity. At the same time the invention incorporates features which are needed for serving complex user requests as listed above. Considering the EMBASSI system the planning component in EMBASSI does not allow conditional planning nor plan repair. The required features concerning the performance of a plan are not realized in the EMBASSI system either.

Throughout this specification, the word "system" mostly comprises the whole dialogue system. In a dialogue system, the function planning module is incorporated into the whole system using a proper communication system. Thus, the feedback of devices and requests of the dialogue manager are handled within this communication system, which mainly consists of so called "handlers". The communication between the reasoning component and plan processor, i.e. the plan processing module, takes place within the function planning module.

REFERENCE SYMBOLS 0 initial state
1 reasoning component
2 plan processing module
70 ready state
71 processing state
72 receiving state
73 first transition
80 first free state
81 scheduling state
82 done state
83 second transition
90 second free state
91 stop processing state
A1 first action statement
A2 second action command
A3 third action command
A4 forth action command
CS current state
D1, . . . , Dn device 1, . . . , device n
DB internal state data base
DF-1, . . . , DF-n device feedback 1, . . . , device feedback n
EPG electronic program guide
FP further plan
FPM function planning module
FSM finite state machine
FSM-1 first finite state machine
FSM-2 second finite state machine
FSM-3 third finite state machine
M-D1, . . . , M-Dn device models of devices D1, . . . , Dn
P determined plan
SD scheduling device
VD virtual device WAIT-1 first wait statement
X User wish
Y start time
Z end time

What is claimed is:

1. Method for operating a dialogue system for serving complex user requests by appropriately controlling a network of devices and/or applications,
 wherein each device and/or application is modeled by a finite state machine, said finite state machine being descriptive for the functions and states of a respective device and/or application,
 wherein transitions of said finite state machine are annotated with statements of a plan language,
 the method comprising:
 receiving a user request by a dialogue manager adapted to receive a user request from a user;
 sending the user request to a reasoning component of a function planning module; and
 determining a determined plan by the reasoning component based on the received user request, said reasoning component being configured to use said finite state machines in order to determine said determined plan, said determined plan being based on said plan language,
 wherein the function planning module includes a plan processing module which is used in order to perform said determined plan for serving the received user request,
 wherein said plan language is designed in order to enable the determination of conditional plans by said reasoning component, by providing conditional planning commands,
 wherein said conditional planning commands include at least one EXPECT-statement,
 wherein said reasoning component is configured to determine a conditional plan as determined plan by using said at least one EXPECT-statement which corresponds to an expected feedback of a device and/or application,
 wherein said plan processing module is configured to receive a current feedback from a device and/or an application when said at least one EXPECT-statement within said conditional plan is executed, wherein if said current feedback corresponds to said expected feedback, the plan processing module is configured to further execute said conditional plan, and else if said current feedback does not correspond to said expected feedback, the plan processing module is configured to execute an alternative plan,
 wherein said plan language comprises a WAIT-statement and said reasoning component plans at least one further plan in case said plan processing module is executing or previously has executed a WAIT-statement and is thus in a waiting state,
 wherein said at least one further plan is executed by said plan processing module, such that said at least one further plan is executed in parallel to said determined plan.

2. Method according to claim 1, wherein said plan processing module is adapted for realizing one subprocess or any combination of sub-processes of the following group of sub-processes consisting of:
 serving different tasks in parallel,
 scheduling tasks at given certain times, and
 interrupting tasks with respect to user and/or application interrupts.

3. Method for operating a dialog system for serving complex user requests by appropriately controlling a network of devices and/or applications:
 wherein each device and/or application is modeled by a finite state machine, said finite state machine being descriptive for the functions and states of a respective device and/or application,
 wherein transitions of said finite state machine are annotated with statements of a plan language,
 the method comprising:
 receiving a user request by a dialogue manager configured to receive a user request from a user;
 sending the user request to a reasoning component of a function planning module; and
 determining a determined plan by the reasoning component based on the received user request, said reasoning component being adapted for using said finite state machines in order to determine said determined plan, said determined plan being based on said plan language,
 wherein the function planning module includes a plan processing module which is used in order to perform said determined plan for serving the received user request, and
 wherein said plan processing module is configured to realize one sub-process or any combination of sub-processes of the following group of sub-processes:
 serving different tasks in parallel,
 scheduling tasks at given certain times, and
 interrupting tasks with respect to user and/or application interrupts,
 wherein said plan language is designed in order to enable the determination of conditional plans by said reasoning component, by providing conditional planning commands,
 wherein said conditional planning commands include at least one EXPECT-statement,
 wherein said reasoning component is configured to determine a conditional plan as determined plan by using said at least one EXPECT-statement which corresponds to an expected feedback of a device and/or application,
 wherein said plan processing module is configured to receive a current feedback from a device and/or an application when said at least one EXPECT-statement within said conditional plan is executed, wherein if said current feedback corresponds to said expected feedback, the plan processing module is configured to further execute said conditional plan, and else if said current feedback does not correspond to said expected feedback, the plan processing module is configured to execute an alternative plan,
 wherein said plan language comprises a WAIT-statement and said reasoning component plans at least one further plan in case said plan processing module is executing or previously has executed a WAIT-statement and is thus in a waiting state,
 wherein said at least one further plan is executed by said plan processing module, such that said at least one further plan is executed in parallel to said determined plan.

4. Method according to claim 3, wherein said method further comprises:
 a planning stage, wherein said determined plan or at least one further plan is determined or said determined plan is modified by said reasoning component,
 an executing stage, wherein said determined plan and/or said at least one further plan is executed by said plan processing module, and
 at least one switching step for switching back and forth between said planning stage and said executing stage, in particular when processing a conditional plan or serving different tasks in parallel.

5. Method according to claim 4, wherein said plan language comprises a REPEAT_WHILE_PENDING-statement that describes an undefined number of WAIT-statements, thus realizing a determined plan of an undefined length comprising an unknown number of statements.

6. Method according to claim 3, wherein said alternative plan is loaded by said plan processing module, or said alternative plan is newly generated by said reasoning component.

7. Method according to claim 5, wherein said alternative plan is newly generated by said reasoning component based on a current state of said dialogue system and/or based on current states of said devices and/or applications.

8. Method according to claim 3, wherein said reasoning component and/or said plan processing module comprise an internal state data base with a data base entry for each device, said data base entry being descriptive for a current state of a respective device, said plan language comprises a GOAL-statement describing a goal state of a certain device and/or application and a REACHED-statement for setting said data base entry of said certain device and/or application to said goal state, wherein, when said REACHED-statement is processed by said plan processing module, the data base entry for said certain device and/or application within the internal state data base is updated and set to said goal state.

9. Method according to claim 8, wherein said determined plan comprises said GOAL-statement followed by following statements, followed by said REACHED-statement, said GOAL-statement is processed by said plan processing module, and in case said certain device and/or application is already in said goal state, said following statements are skipped and said REACHED-statement is processed directly after said GOAL-statement, and in case said certain device and/or application is not in said goal state, said following statements are processed, and said REACHED-statement is processed by said plan processing module thereby setting said data base entry for said certain device and/or application to said goal state.

10. Method according to claim 3, wherein certain functionalities are described by virtual devices that are modeled by a respective finite state machine.

11. Method according to claim 10, wherein said virtual devices comprise a scheduling device for providing a scheduling function within a determined plan.

12. Method according to claim 11, wherein said scheduling function is provided to said devices and/or applications of said network and thus enables the scheduling of tasks provided by said devices and/or applications of said network and/or the scheduling of a determined plan.

13. Method according to claim 10, wherein said virtual devices comprise a stopping device for providing a stopping function within a determined plan.

14. Method according to claim 13, wherein said stopping function is provided to said devices and/or applications of said network and thus enables the stopping of tasks provided by said devices and/or applications of said network and/or the stopping of a determined plan.

15. Method according to claim 3, wherein said plan language and said determined plan comprises exclusively any or any combination exclusively of the following statements:
ACTION: instructing a device to perform a task;
WAIT: modeling that a device and/or application is in a waiting state;
REPEAT_WHILE_PENDING: modeling an unknown number of WAIT-statements;
EXPECT: in case an expected feedback is received from a device and/or application, said determined plan is continued to be executed, otherwise an alternative plan is executed by said plan processing module;
GOAL: in case a device is in a goal state that is indicated by said GOAL-statement, following statements are skipped until a REACHED-statement is reached, and in case said device and/or application is not in said goal state, the following statements are processed;
REACHED: updating an internal state data base with the current state of a respective device and/or application;
thus enabling a simple description language regarding expressive power with a low complexity.

16. Method according to claim 3 wherein in case said reasoning component determines several possible plans for serving a received complex user request, said reasoning component selects said determined plan from said several possible plans depending on cost aspects for the user.

17. Method according to claim 3, wherein in case said reasoning component determines several possible plans for serving a received complex user request, said reasoning component selects said determined plan based on a selection of the user and/or based on predetermined preferences.

18. Dialogue system for serving complex user requests by appropriately controlling a network of devices and/or applications, comprising:
a device and/or application that is modeled by a finite state machine, said finite state machine being descriptive for the functions and states of a respective device and/or application,
wherein transitions of said finite state machine are annotated with statements of a plan language;
means for receiving a user request by a dialogue manager adapted to receive a user request from a user;
means for sending the user request to a reasoning component of a function planning module; and
means for determining a determined plan by the reasoning component based on the received user request, said reasoning component being configured to use said finite state machines in order to determine said determined plan, said determined plan being based on said plan language,
wherein the function planning module includes a plan processing module which is used in order to perform said determined plan for serving the received user request,
wherein said plan language is designed in order to enable the determination of conditional plans by said reasoning component, by providing conditional planning commands,
wherein said conditional planning commands include at least one EXPECT-statement,
wherein said reasoning component is configured to determine a conditional plan as determined plan by using said at least one EXPECT-statement which corresponds to an expected feedback of a device and/or application, and
wherein said plan processing module is configured to receive a current feedback from a device and/or an application when said at least one EXPECT-statement within said conditional plan is executed, wherein if said current feedback corresponds to said expected feedback, the plan processing module is configured to further execute said conditional plan, and else if said current feedback does not correspond to said expected feedback, the plan processing module is configured to execute an alternative plan,
wherein said plan language comprises a WAIT-statement and said reasoning component plans at least one further plan in case said plan processing module is executing or previously has executed a WAIT-statement and is thus in a waiting state, wherein said at least one further plan is executed by said plan processing module, such that said at least one further plan is executed in parallel to said determined plan.

19. Computer readable storage medium encoded with instructions, which when executed by computer, causes the computer to implement the method of claim 1.

* * * * *